United States Patent
Matsuoka et al.

(10) Patent No.: US 9,292,178 B2
(45) Date of Patent: Mar. 22, 2016

(54) INFORMATION DISPLAY APPARATUS FOR A VEHICLE

(75) Inventors: Yasuhito Matsuoka, Nagoya (JP); Yasuhiro Sakamoto, Okazaki (JP); Atsushi Watanabe, Anjo (JP); Masako Abe, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 100 days.

(21) Appl. No.: 13/825,943

(22) PCT Filed: Aug. 20, 2012

(86) PCT No.: PCT/JP2012/005200
§ 371 (c)(1),
(2), (4) Date: Mar. 25, 2013

(87) PCT Pub. No.: WO2013/132547
PCT Pub. Date: Sep. 12, 2013

(65) Prior Publication Data
US 2014/0143702 A1    May 22, 2014

(30) Foreign Application Priority Data

Mar. 9, 2012  (JP) ................................. 2012-052544

(51) Int. Cl.
*G06F 3/14*     (2006.01)
*G06F 3/0484*   (2013.01)
(Continued)

(52) U.S. Cl.
CPC .............. *G06F 3/0484* (2013.01); *B60K 35/00* (2013.01); *B60L 7/12* (2013.01); *B60L 7/18* (2013.01);
(Continued)

(58) Field of Classification Search
CPC .................................... G06F 3/14; G06F 3/17
USPC ........................... 715/772; 340/461; 320/109
See application file for complete search history.

(56) References Cited

U.S. PATENT DOCUMENTS 6,125,953 A    10/2000  Arai et al.
2004/0100750 A1  5/2004  Shigeta et al.
(Continued)

FOREIGN PATENT DOCUMENTS

CN    102013708 A    4/2011
JP    64-027615-UM A  2/1989
(Continued)

OTHER PUBLICATIONS

FUGA HYBRID Y51 type vehicle, New Car Manual, Japan, Nissan Motor.
(Continued)

*Primary Examiner* — Ruay Ho
(74) *Attorney, Agent, or Firm* — Birch, Stewart, Kolasch & Birch, LLP

(57) ABSTRACT

An information display apparatus for a vehicle which is advantageous in displaying an energy flow in an easy-to-understand way to the driver is provided. A battery icon represents a driving battery. An engine icon represents an engine. A front-wheel icon and a rear-wheel icon represent front wheels and rear wheels, respectively. An energy transmission state displaying portion indicates the transmission state of energy and is displayed while being directly bridged between the battery icon, the engine icon, the front-wheel icon, and the rear-wheel icon. The energy transmission state displaying portion indicates the presence or absence and the direction of transmission of energy between the driving battery, the engine, the front wheels, and the rear wheels.

20 Claims, 17 Drawing Sheets

(51) Int. Cl.

| | | |
|---|---|---|
| *B60K 35/00* | (2006.01) | |
| *B60L 7/12* | (2006.01) | |
| *B60L 7/18* | (2006.01) | |
| *B60L 11/12* | (2006.01) | |
| *B60L 11/14* | (2006.01) | |
| *B60L 11/18* | (2006.01) | |
| *G06F 3/0481* | (2013.01) | |

(52) U.S. Cl.
CPC ............... *B60L 11/123* (2013.01); *B60L 11/14* (2013.01); *B60L 11/1816* (2013.01); *B60L 11/1877* (2013.01); *G06F 3/04817* (2013.01); *B60L 2250/16* (2013.01); *B60L 2260/28* (2013.01); *Y02T 10/6217* (2013.01); *Y02T 10/7005* (2013.01); *Y02T 10/705* (2013.01); *Y02T 10/7077* (2013.01); *Y02T 90/14* (2013.01)

(56) References Cited

U.S. PATENT DOCUMENTS

| | | | |
|---|---|---|---|
| 2005/0128065 A1* | 6/2005 | Kolpasky et al. ............. | 340/461 |
| 2007/0208468 A1 | 9/2007 | Sankaran et al. | |
| 2009/0030572 A1 | 1/2009 | Takahashi et al. | |
| 2010/0057281 A1 | 3/2010 | Lawyer et al. | |
| 2010/0305795 A1 | 12/2010 | Kuang et al. | |
| 2011/0057612 A1* | 3/2011 | Taguchi et al. ............... | 320/109 |

FOREIGN PATENT DOCUMENTS

| | | | |
|---|---|---|---|
| JP | 9-98501 | A | 4/1997 |
| JP | 11-098603 | A | 4/1999 |
| JP | 11-220808 | A | 8/1999 |
| JP | 2000-247164 | A | 9/2000 |
| JP | 3092494 | B2 | 9/2000 |
| JP | 2001-231109 | A | 8/2001 |
| JP | 2002-247706 | A | 8/2002 |
| JP | 2004-078585 | A | 3/2004 |
| JP | 2005-9381 | A | 1/2005 |
| JP | 2006-67669 | A | 3/2006 |
| JP | 3780251 | B2 | 5/2006 |
| JP | 2007-050889 | A | 3/2007 |
| JP | 3893882 | B2 | 3/2007 |
| JP | 2007-118641 | A | 5/2007 |
| JP | 2008-501573 | A | 1/2008 |
| JP | 2009-29181 | A | 2/2009 |
| JP | 2009-137553 | A | 6/2009 |
| JP | 2010-167960 | A | 8/2010 |

OTHER PUBLICATIONS

Japanese Office Action mailed Apr. 25, 2014 for related application No. 2012-558096.
Chinese Office Action mailed Apr. 14, 2015 in Chinese Patent Application No. 2012800034492.
Japanese Office Action mailed Jan. 27, 2015 in Japanese Patent Application No. 2012-558096 (with English translation).
Japanese Office Action mailed Jun. 2, 2015 in Japanese Patent Application No. 2014-135565 (with English translation).

* cited by examiner

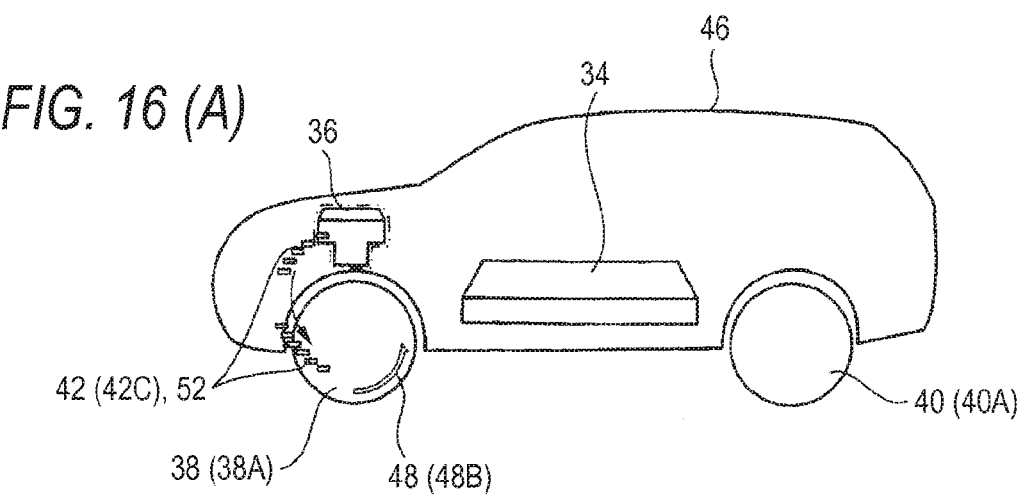
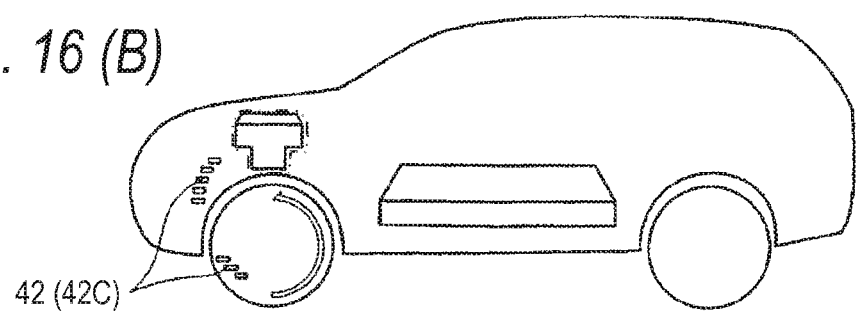
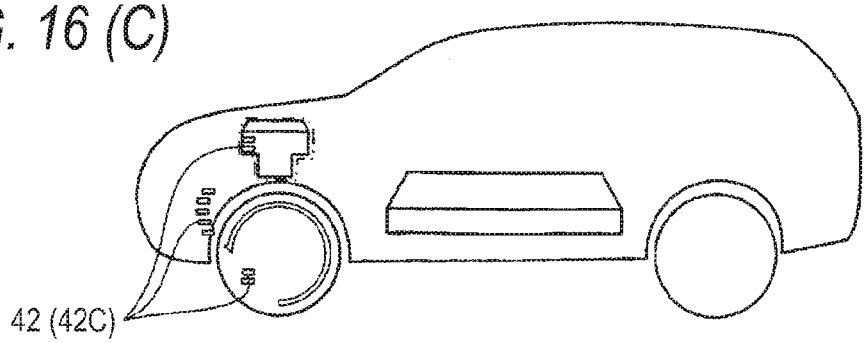
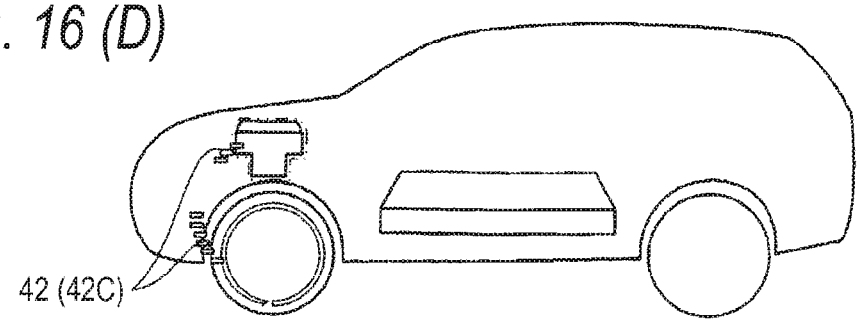

INFORMATION DISPLAY APPARATUS FOR A VEHICLE

TECHNICAL FIELD

The present invention relates to an information display apparatus for a vehicle which indicates a transmission state of energy.

BACKGROUND ART

Techniques have been proposed in which, in a hybrid automobile that travels by using one or both of an engine and a motor, an energy flow between the engine, the motor, a battery, and tires is displayed (see Patent Documents 1, 2, and 3).

In these techniques, icons representing the engine, the motor, the battery, and the tires are displayed, and a displaying portion representing an energy flow such as an arrow is displayed between the icons.

PRIOR ART REFERENCE

Patent Document

Patent Document 1: Japanese Patent No. 3092494
Patent Document 2: Japanese Patent No. 3780251
Patent Document 3: Japanese Patent No. 3893882

SUMMARY OF THE INVENTION

Problems that the Invention is to Solve

In the above-described prior art, however, the large number of icons are used, and therefore the display contents tend to be complicated. Consequently, there is a room for improving the manner of displaying an energy flow in an easy-to-understand way to the driver.

The invention has been conceived in view of the circumstances. It is an object of the invention to provide an information display apparatus for a vehicle which is advantageous in displaying an energy flow in an easy-to-understand way to the driver.

Means for Solving the Problems

In order to achieve the object, the invention provides an information display apparatus for a vehicle which is to be mounted on the vehicle, the vehicle including: a battery for storing energy; an electric motor that is driven by the energy; and wheels that are rotated by the electric motor, the information display apparatus is characterized by comprising: an energy transmission state determination device which is configured to determine a transmission state of the energy; and a display device which is configured to display a battery icon representing the battery, a wheel icon representing the wheels, and an energy transmission state displaying portion indicating the transmission state of the energy, wherein the energy transmission state displaying portion is displayed while being directly bridged between the battery icon and the wheel icon.

Effects of the Invention

According to the first aspect of the invention, the energy transmission state displaying portion indicates the transmission state of energy and is displayed while being directly bridge between the battery icon and the wheel icon. Therefore, the configuration is advantageous in displaying an energy flow in an easy-to-understand way by minimum necessary display contents.

According to the second aspect of the invention, the energy transmission state displaying portion indicates the presence or absence of the transmission of energy between the battery icon, the internal-combustion engine icon, and the wheel icon, and the transmission direction of energy. Therefore, the configuration is advantageous in displaying an energy flow in an easy-to-understand way in a vehicle on which a battery and an internal combustion engine are mounted.

According to the third and fourth aspects of the invention, the energy transmission state displaying portion indicates the transmission direction of energy by changing the display state of the display member with the passage of time. Therefore, the configuration is further advantageous in displaying an energy flow in an easy-to-understand way.

According to the fifth aspect of the invention, the energy transmission state displaying portion indicates the transmission direction of energy by changing the display state of the display member with the passage of time, and the transmission of electric power energy and that of driving force energy can be distinguished from each other at a glance. Therefore, the configuration is advantageous in improving the visibility.

According to the sixth and seventh aspects of the invention, the arrow line indicating the rotation direction of the wheels is displayed. Therefore, the energy transmission and the rotation direction of the wheels can be simultaneously known.

According to the eighth aspect of the invention, at the same time when the rotation direction of the wheels is known, the correspondence relationship between the energy transmission and the rotation of the wheels can be visually known in an easily manner.

According to the ninth aspect of the invention, the manner of displaying the arrow line can be varied in accordance with the kind of the energy transmission, and an arrow line having one completed arrow head portion can be formed by the two indications, i.e., the first arrow indication and the second arrow indication. At the same time when the rotation direction of the wheels is known, therefore, the correspondence relationship between the energy transmission and the rotation of the wheels can be visually known in a further easily manner.

According to the tenth aspect of the invention, if it is determined that charging of the battery by the charging apparatus outside of the vehicle exists, the charge icon indicating the charging operation by the charging apparatus is displayed. Therefore, the configuration is advantageous in displaying the charge state in an easy-to-understand way.

BRIEF DESCRIPTION OF THE DRAWINGS

FIG. 16(A) to FIG. 16(D) are diagrams in which the arrow line 48 indicating the rotation direction of the wheels is added to the displaying operation in the case of the engine running.

MODE FOR CARRYING OUT THE INVENTION

Next, an embodiment of the invention will be described with reference to the drawings.

In the embodiment, a case where the vehicle is a plug-in hybrid electric vehicle (PHEV vehicle) will be described.

Figure 1:
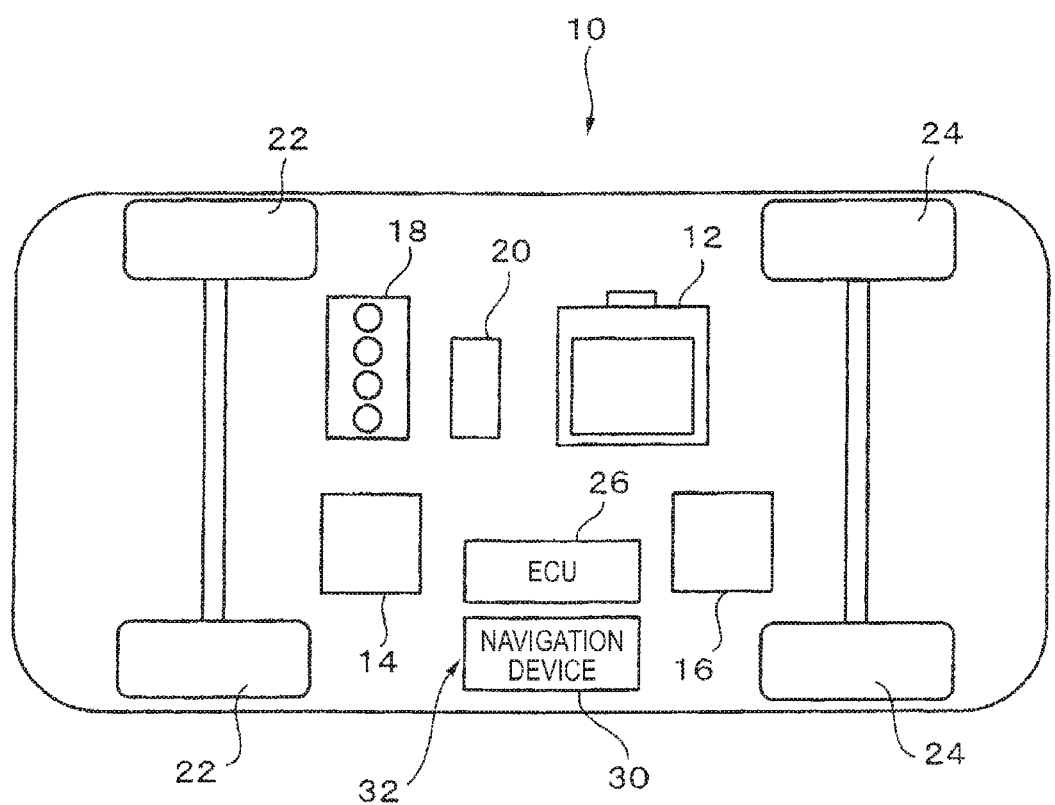
FIG. 1 is a diagram showing the configuration of a vehicle on which an information display apparatus 32 for a vehicle of the embodiment is mounted.

As shown in FIG. 1, the vehicle 10 includes a driving battery 12 (battery), a front motor 14, a rear motor 16, an engine 18 (internal combustion engine), a generator 20, a power transmission mechanism which is not shown, front wheels 22, rear wheels 24, a PHEV ECU 26 (hereinafter, referred to as the ECU 26), a charge control ECU 28 (FIG. 2), and a navigation device 30.

The information display apparatus 32 for a vehicle of the embodiment includes the ECU 26, the charge control ECU 28, and the navigation device 30.

The driving battery 12 stores energy, and supplies electric energy (electric power) as energy to the front motor 14 and the rear motor 16.

The driving battery 12 is charged by the following methods:

1) the battery is charged by using electric power generated by the generator 20 driven by the engine 18;

2) during regenerative braking in which a regenerative braking force caused by the front motor 14 is used, the battery is charged by electric power generated by the front motor 14 driven by rotation of the front wheels 22;

3) during regenerative braking in which a regenerative braking force caused by the rear motor 16 is used, the battery is charged by electric power generated by the rear motor 16 driven by rotation of the rear wheels 24; and 4) the battery is charged by electric power supplied through a charging cable from a charging apparatus which is disposed outside of the vehicle 10.

The operation of charging the driving battery 12 by the charging apparatus is controlled by the charge control ECU 28 which will be described later.

The front motor 14 is driven by battery electric power supplied from the driving battery 12, and generated electric power supplied from the generator 20, and provides the front wheels 22 with power via the power transmission mechanism, thereby rotating the front wheels 22.

The rear motor 16 is driven by the battery electric power supplied from the driving battery 12, and the generated electric power supplied from the generator 20, and provides the rear wheels 24 with power via the power transmission mechanism, thereby rotating the rear wheels 24.

The engine 18 burns fuel to generate rotational energy (power) as energy, and provides the front wheels 22 with power via the power transmission mechanism, thereby rotating the front wheels 22.

Furthermore, the engine 18 provides the generator 20 with power to drive the generator 20, thereby generating electric power.

The generator 20 is caused to generate electric power by the power provided from the engine 18, and supplies the generated electric power to the driving battery 12.

The front wheels 22 and the rear wheels 24 are rotationally driven by the power supplied via the power transmission mechanism.

The ECU 26 includes: a CPU; a ROM which stores/memorizes a control program and the like; a RAM functioning as a working area for the control program; an interface section which interfaces with peripheral circuits and the like; etc.

Figure 2:
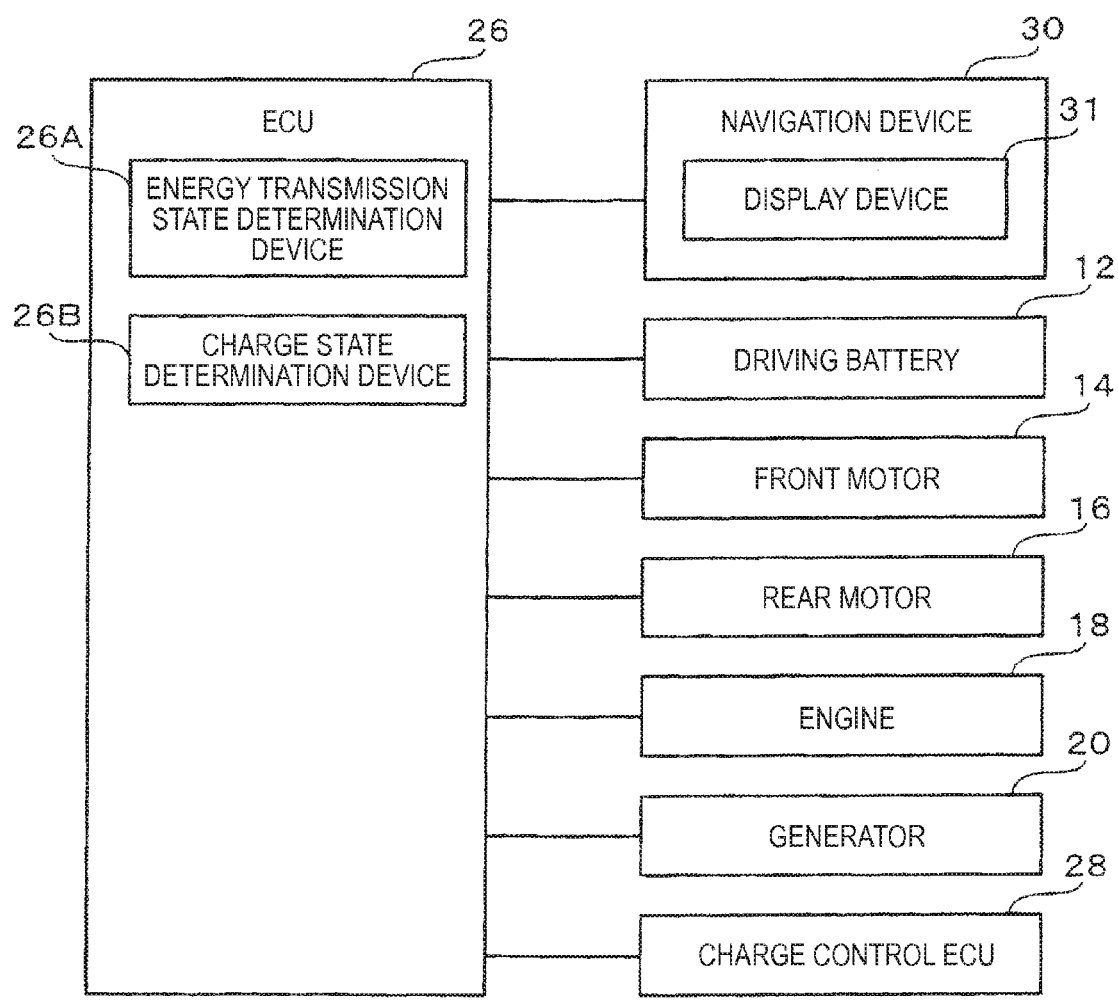
FIG. 2 is a block diagram showing a control system of the information display apparatus 32 for a vehicle of the embodiment.

As shown in FIG. 2, the ECU 26 executes the control program to control the driving battery 12, the front motor 14, the rear motor 16, the engine 18, the generator 20, and the navigation device 30.

Namely, the ECU 26 controls the operations of the driving battery 12, the front motor 14, the rear motor 16, the engine 18, and the generator 20, thereby realizing runnings of various running modes which will be described later.

Moreover, the ECU 26 executes the control program to realize an energy transmission state determination device 26A and a charge state determination device 26B.

The energy transmission state determination device 26A determines the transmission state of energy.

In the embodiment, the transmission state of energy is as exemplified in (A) to (H) below:

(A) a state where the energy of the driving battery 12 is transmitted to the front wheels 22 via the front motor 14;

(B) a state where the energy of the driving battery 12 is transmitted to the rear wheels 24 via the rear motor 16;

(C) a state where the energy of the engine 18 is transmitted to the driving battery 12 via the generator 20 (a state where the driving battery 12 is charged);

(D) a state where the energy of the driving battery 12 is transmitted to the engine 18 via the generator 20 (a state where the engine 18 is driven).

(E) a state where the energy of the engine 18 is transmitted to the front wheels 22;

(F) a state where the energy of the front wheels 22 is transmitted to the driving battery 12 via the front motor 14 (a state where the driving battery 12 is charged); and (G) a state where the energy of the rear wheels 24 is transmitted to the driving battery 12 via the rear motor 16 (a state where the driving battery 12 is charged).

The charge state determination device 26B determines whether charging of the driving battery 12 by the charging apparatus outside of the vehicle 10 exists or not, i.e., the presence or absence of external charging.

When a power supplying connector of a charging cable of the charging apparatus outside of the vehicle 10 is connected to a power receiving connector disposed in the vehicle 10, the charge control ECU 28 performs the operation of charging the driving battery 12, and transmits information indicative of the implementation of the charging operation, to the ECU 26, Upon receiving the information, the ECU 26 functions as the charge state determination device 26B.

Based on a result of positioning of the vehicle 10, the navigation device 30 causes map information and route information to be displayed on a display screen of a display device 31 which is disposed in a place where the driver can view the device. In the embodiment, the navigation device 30 functions as a display device.

The display device displays display contents which are based on a result of the determination of the energy transmission state which is supplied from the energy transmission state determination device 26A, and that of the charge state of the driving battery 12 which is supplied from the charge state determination device 26B, on the display screen.

As shown in FIGS. 4(A) to 9(D), namely, the display device displays a battery icon 34, an engine icon 36, a front-wheel icon 38, a rear-wheel icon 40, and an energy transmission state displaying portion 42 on the display screen.

As shown in FIGS. 10(A) to 10(G), furthermore, the display device displays a charge icon 44 on the display screen.

As shown in FIGS. 11(A) to 16(D), at the same time when the battery icon 34, the engine icon 36, the front-wheel icon 38, the rear-wheel icon 40, and the energy transmission state displaying portion 42 are displayed on the display screen, moreover, arrow lines 48 indicating the rotation direction of the wheels are displayed while being superimposed on wheel symbols 38A, 40A as the front-wheel icon 38 and the rear-wheel icon 40.

In the embodiment, the case where the display device is configured by the navigation device 30 has been described. Alternatively, the display device may be configured separately from the navigation device 30. For example, the display screen may be disposed in an indicator portion of an instrument panel.

The battery icon 34 represents the driving battery 12.

The engine icon 36 represents the engine 18.

The front-wheel icon 38 and the rear-wheel icon 40 represent the front wheels 22 and the rear wheels 24, respectively, and are configured by the wheel symbols 38A, 40A representing the shapes of the wheels, and the arrow lines 48 indicating the rotation direction of the wheels. The arrow lines 48 extend along the outer circumferences of the wheels represented by the wheel symbols 38A, 40A, and are displayed while being superimposed on the wheel symbols 38A, 40A. The front-wheel icon 38 and the rear-wheel icon 40 correspond to wheel icons.

The energy transmission state displaying portion 42 indicates the transmission state of energy, and the state is displayed while being directly bridged between the battery icon 34, the engine icon 36, the front-wheel icon 38, and the rear-wheel icon 40.

Namely, the energy transmission state displaying portion 42 indicates the presence or absence and the direction of transmission of energy between the driving battery 12, the engine 18, the front wheels 22, and the rear wheels 24.

As shown in FIGS. 5(A) to 5(D), the energy transmission state displaying portion 42 includes first to fourth display members 42A to 42D.

The first display member 42A extends in the direction connecting the battery icon 34 and the front-wheel icon 38. Namely, the first display member 42A is displayed while being directly bridged between the battery icon 34 and the front-wheel icon 38 to indicate transmission of electric power energy.

The second display member 42B extends in the direction connecting the battery icon 34 and the rear-wheel icon 40. Namely, the second display member 42B is displayed while being directly bridged between the battery icon 34 and the rear-wheel icon 40 to indicate transmission of electric power energy.

The third display member 42C extends in the direction connecting the engine icon 36 and the front-wheel icon 38, and indicates transmission of output driving force energy from the engine 18. Namely, the third display member 42C is displayed while being directly bridged between the engine icon 36 and the front-wheel icon 38.

The fourth display member 42D extends in the direction connecting the engine icon 36 and the battery icon 34, and indicates transmission of charging power energy from the engine 18 to the battery 12. Namely, the fourth display member 42D is displayed while being directly bridged between the engine icon 36 and the battery icon 34.

When the display members 42A to 42D are displayed by the display device, it is indicated that energy is transmitted, and, when the display members 42A to 42D are not displayed, it is indicated that energy is not transmitted.

Moreover, the display states of the display members 42A to 42D are changed by the display device with the passage of time, thereby indicating the transmission direction of energy.

Furthermore, the display colors of the display members 42A to 42D may be arbitrarily selected.

For example, the first, second, and fourth display members 42A, 42B, 42D indicating electric power energy corresponding to the electric power (electric energy) are displayed in blue (in the figure illustration, the members are illustrated by solid black marks), and the third display member 42c indicating driving force energy corresponding to the power of the engine 18 is displayed in orange (in the figure illustration, the member is illustrated by hollow white marks). According to the configuration, it is possible to distinguish at a glance the electric power energy corresponding to the electric power and the driving force energy corresponding to the power of the engine 18 from each other, and the configuration is advantageous in improving the visibility.

Figure 3:
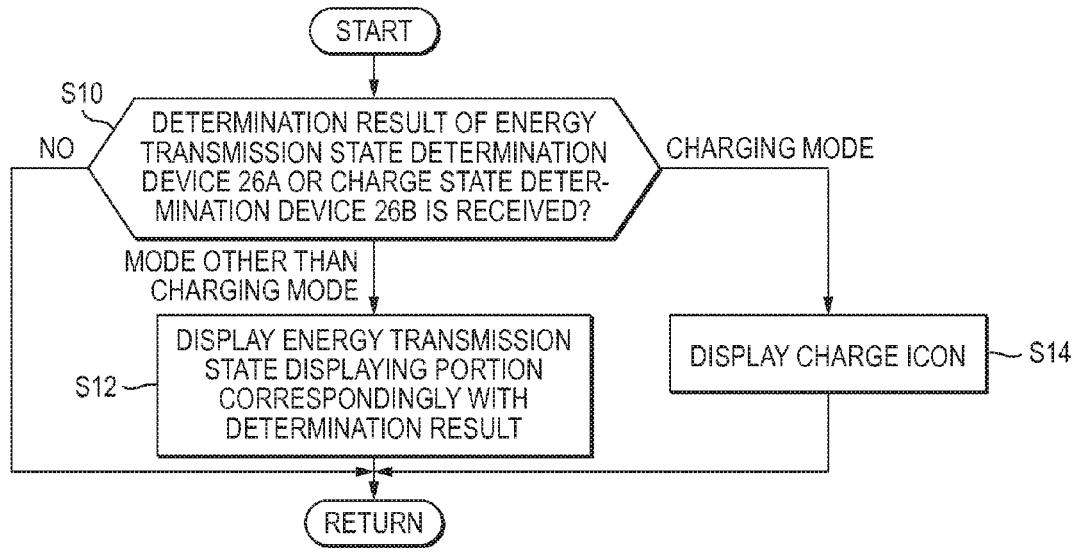
FIG. 3 is a flowchart showing a displaying operation of the information display apparatus 32 for a vehicle of the embodiment.
Figure 4:
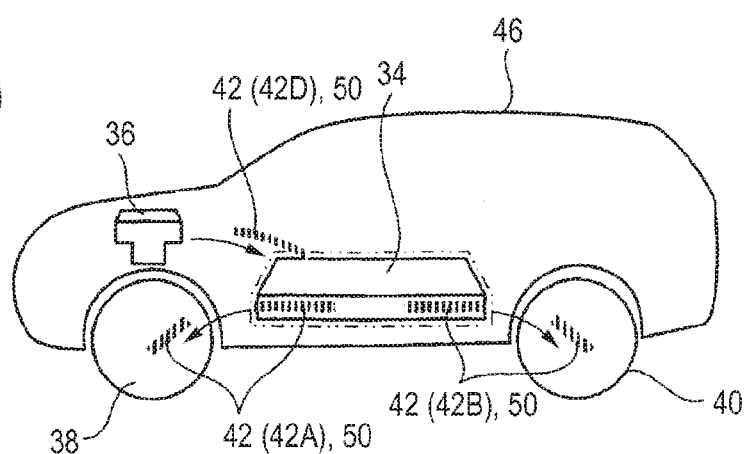
FIG. 4(A) to FIG. 4(D) are diagrams illustrating the displaying operation in the case where a charging operation by an engine 18 and running by a driving battery 12 are performed.
Figure 4:
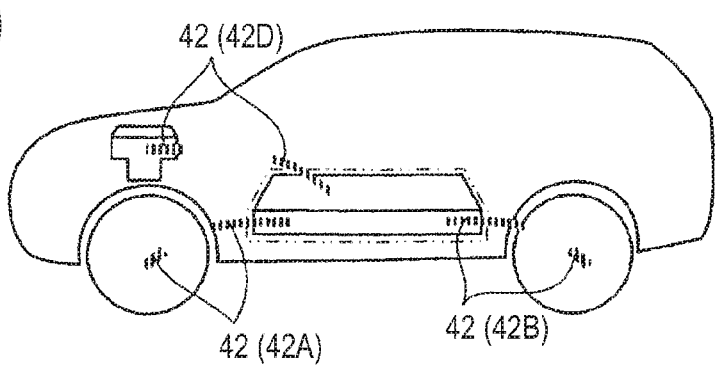
Figure 4:
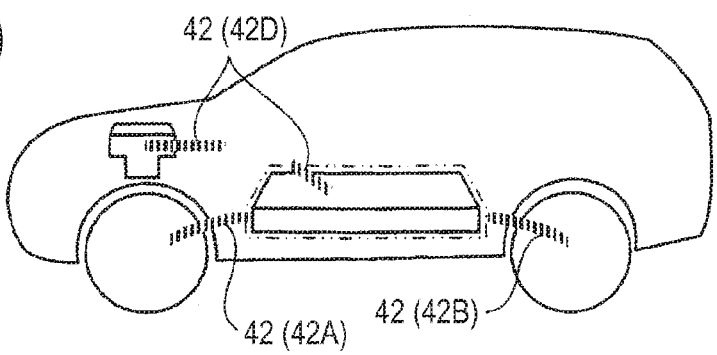
Figure 4:
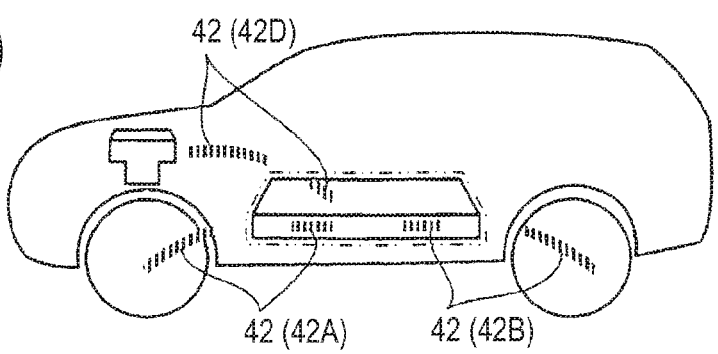
Figure 5:
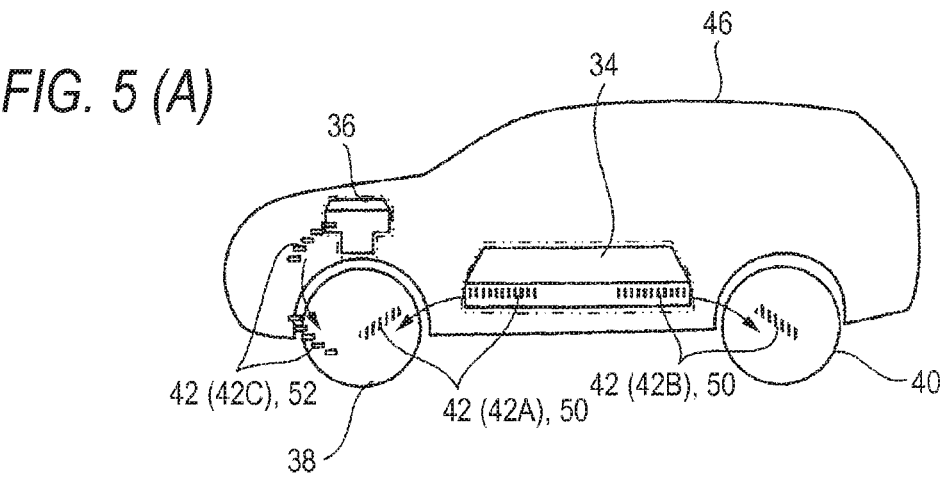
FIG. 5(A) to FIG. 5(D) are diagrams illustrating the displaying operation in the case where the running by the engine 18 and the driving battery 12 is performed.
Figure 5:
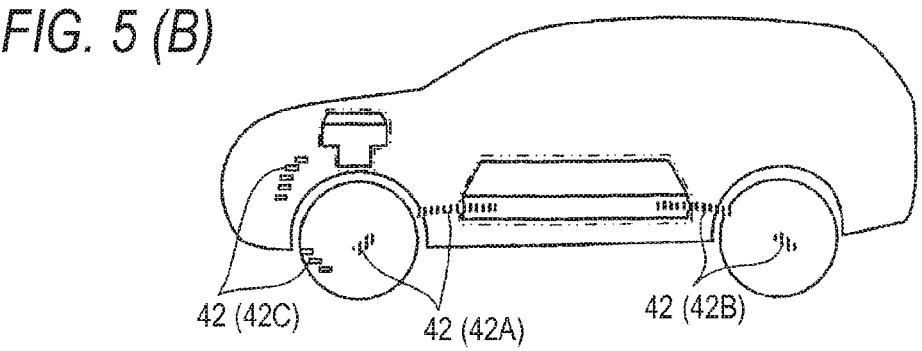
Figure 5:
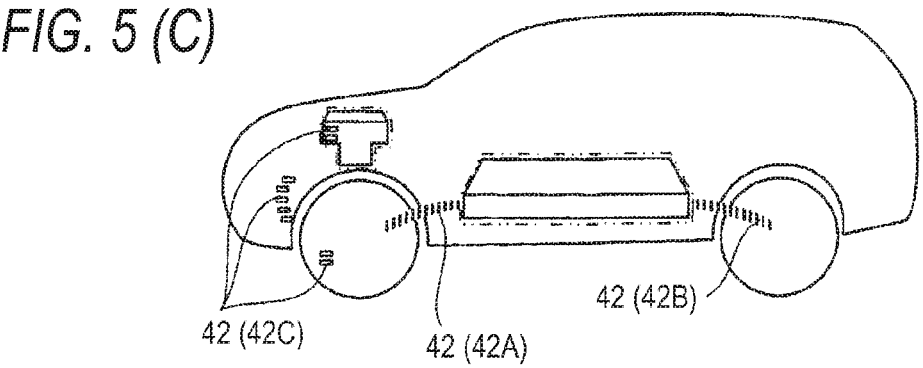
Figure 5:
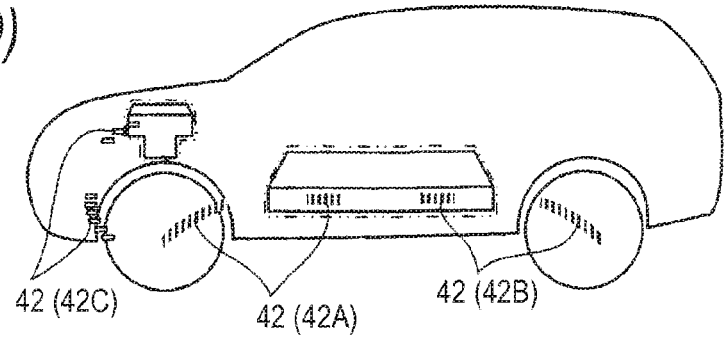
Figure 6:
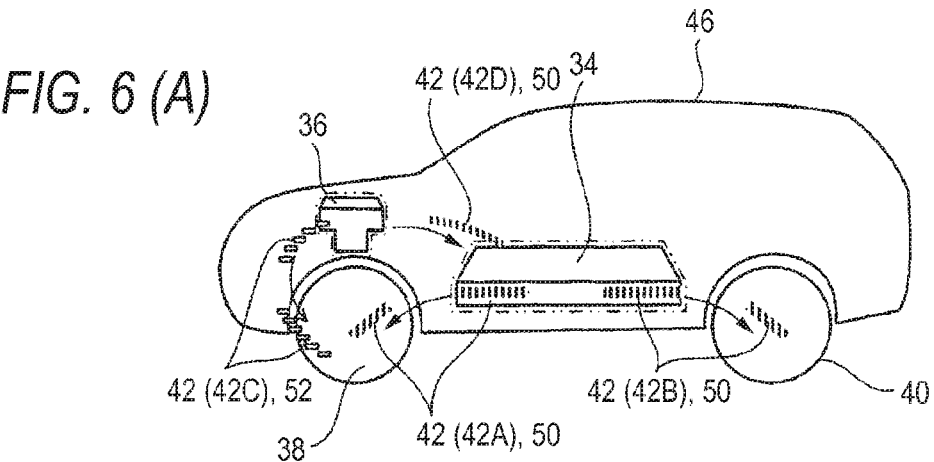
FIG. 6(A) to FIG. 6(D) are diagrams illustrating the displaying operation in the case where the charging operation by the engine 18 and the running by the engine 18 and the driving battery 12 are performed.
Figure 6:
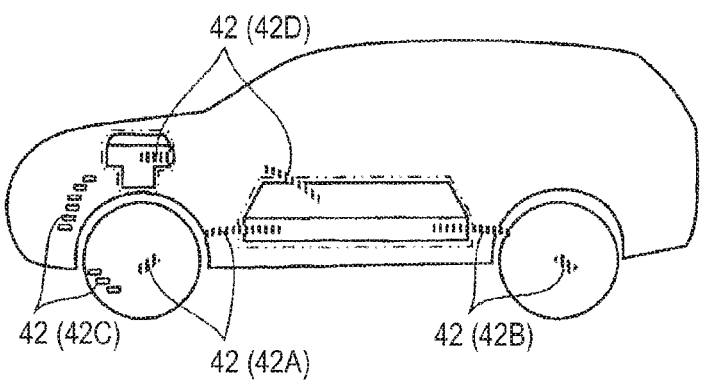
Figure 6:
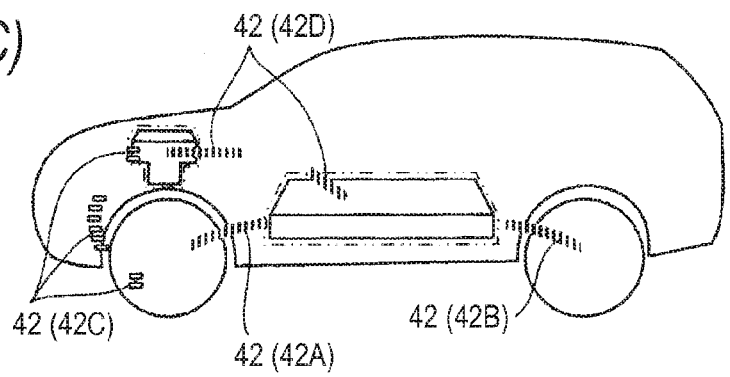
Figure 6:
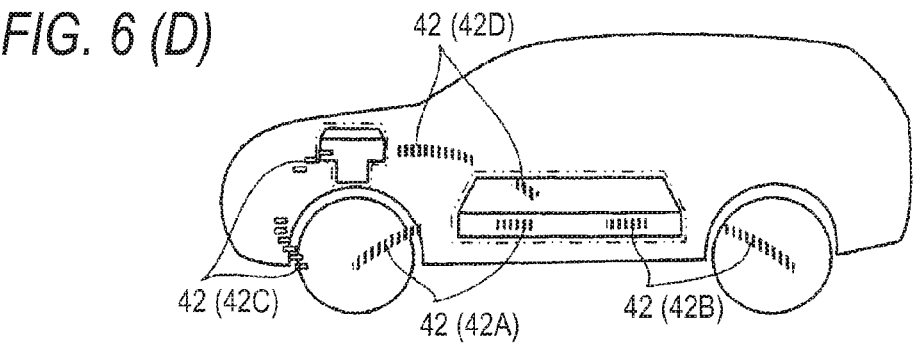

Next, the displaying operation of the information display apparatus 32 for a vehicle will be described with reference to the flowchart of FIG. 3.

The navigation device 30 is configured so that either a mode in which the operation of displaying the energy transmission state is performed, or that in which the operation is not performed can be adequately selected by operation of a setting switch of the navigation device 30.

In the following description, it is assumed that the mode in which the operation of displaying the energy transmission state is performed is set. In the mode, as shown in FIG. 4(A), the battery icon 34, the engine icon 36, the front-wheel icon 38, and the rear-wheel icon 40 are always displayed.

The battery icon 34 and the engine icon 36 are displayed in a state where a vehicle displaying portion 46 is displayed in a see-through manner, or in a so-called skeleton display, thereby improving the visibility and the design.

The navigation device 30 monitors determination results of the energy transmission state determination device 26A and the charge state determination device 26B, and, when the device receives a determination result, determines whether the determination result is one of the transmission states (A) to (H) of energy or not, and whether external charging is performed or not, i.e., whether the mode is a mode other than a charging mode or the charging mode (step S10).

If it is determined in step S10 that the mode is a mode other than a charging mode, the energy transmission state displaying portion 42 (FIGS. 4(A) to 9(D) and FIGS. 11(A) to 16(D)) is displayed correspondingly with the received determination result (step S12), and the process returns to step S10.

If it is determined in step S10 that the mode is the charging mode, the charge icon 44 (FIGS. 10(A) to 10(G)) is displayed (step S14), and the process returns to step S10.

If a determination result has not been received in step S10, the process returns to step S10.

Next, six kinds of energy transmission states, and display contents respectively corresponding to the energy transmission states will be specifically described.

Furthermore, display contents to which the arrow lines 48 indicating the rotation directions of the wheels in the respective energy transmission states are added will be specifically described.

The six kinds of energy transmission states which will be described are mere examples, and it is a matter of course that various energy transmission states exist.

(1) The Case where the Charging Operation by the Engine 18 and the Running by the Driving Battery 12 are Performed (FIGS. 4(A) to 4(D)) (FIGS. 11(A) to 11(D)):

In this case, the operation of causing the generator 20 to generate electricity by the power of the engine 18, and charging the driving battery 12 with the generated electric power, and that of causing the front motor 14 and the rear motor 16 to rotate by the electric power of the driving battery 12, thereby driving the front wheels 22 and the rear wheels 24 are simultaneously performed.

Three display members, i.e., the fourth display member 42D being bridged between the engine icon 36 and the battery icon 34, the first display member 42A being bridged between the battery icon 34 and the front-wheel icon 38, and the second display member 42B being bridged between the battery icon 34 and the rear-wheel icon 40 are displayed.

Moreover, the third display member 42C is not displayed, thereby indicating that transmission of driving force energy between the engine 18 and the front wheels 22 is not performed.

Then, the images of FIGS. 4(A) to 4(D) are repeatedly displayed in this sequence to cause the display states of the display members 42D, 42A, 42B to be changed with the passage of time.

Namely, each of the display members 42D, 42A, 42B is divided into a plurality of display regions (first display segments 50) along the extending direction, and the display and non-display of each of the display regions are sequentially switched over with the passage of time, so that the display regions are displayed as if they sequentially move along the energy transmission direction.

Therefore, the direction of transmission of charging power energy from the engine 18 to the battery 12 is indicated by the fourth display member 42D, and the directions of transmission of electric power energy from the battery to the front wheels 22 and the rear wheels 24 are indicated by the first and second display members 42A, 42B.

In FIG. 4(A) and subsequent figures, the arrows in the vicinities of the display members 42 are used for illustrating the moving directions of the display members 42, and are not displayed on the actual screen.

In FIG. 4(A) and subsequent figures, moreover, the dash-dot-dot line surrounding the battery icon 34 indicates a state where a frame-like area along the outline of the battery icon 34 is displayed so as to be higher in luminance than the battery icon 34.

The display is performed as described above, so that the situation where the driving battery 12 functions can be visually known in an easily manner.

As shown in FIGS. 11(A) to 11(D), arrow lines 48 (first arrow indications 48A) indicating the wheel rotation directions of the front wheels 22 and the rear wheels 24 are displayed correspondingly with the transmission of electric power energy from the driving battery 12 to the front wheels 22 and the rear wheels 24.

The arrow lines 48 are superimposedly displayed along the outer circumferences of the wheel symbols 38A, 40A representing the shapes of the front wheels, and the wheel symbols 38A, 40A representing the shapes of the rear wheels, so that also the rotation directions of the wheels can be visually known in an easily manner by means of the wheel icons 38, 40. Correspondingly with the first and second display members 42A, 42B indicating transmission of electric power energy, moreover, the arrow lines are displayed, for example, in the same color (or a similar color), and by the lines of the same thickness and of the same kind or broken lines or dot-dash lines, whereby the correspondence relationship between the energy transmission and the rotations of the wheels can be visually known in an easily manner.

(2) The case where the running of the engine 18 and the driving battery 12 is performed (FIGS. 5(A) to 5(D)) (FIGS. 12(A) to 12(D)):

In this case, the operation of driving the front wheels 22 by the power of the engine 18, and that of rotating the front motor 14 and the rear motor 16 by the electric power of the driving battery 12 to drive the front wheels 22 and the rear wheels 24 are simultaneously performed.

Three display members, i.e., the third display member 42C being bridged between the engine icon 36 and the front-wheel icon 38, the first display member 42A being bridged between the battery icon 34 and the front-wheel icon 38, and the second display member 42B being bridged between the battery icon 34 and the rear-wheel icon 40 are displayed.

Moreover, the fourth display member 42D is not displayed, thereby indicating that transmission of charging power energy between the engine 18 and the driving battery 12 is not performed.

Then, the images of FIGS. 5(A) to (D) are repeatedly displayed in this sequence to cause the display states of the display members 42C, 42A, 42B to be changed with the passage of time.

Namely, each of the display members 42A, 42B is divided into a plurality of display regions (first display segments 50) along the extending direction, and the display and non-display of each of the display regions are sequentially switched over with the passage of time, so that the display regions are displayed as if they sequentially move along the energy transmission direction. The display member 42C is divided into a plurality of display regions (second display segments 52) along the extending direction, and the display and non-display of each of the display regions are sequentially switched over with the passage of time, so that the display regions are displayed as if they sequentially move along the energy transmission direction.

Therefore, the direction of transmission of driving force energy from the engine 18 to the front wheels 22 is indicated by the third display member 42C, and the directions of transmission of electric power energy from the driving battery 12 to the front wheels 22 and the rear wheels 24 are indicated by the first and second display members 42A, 42B.

In FIG. 5(A) and subsequent figures, moreover, the dash-dot-dot line surrounding the engine icon 36 indicates a state where an area which includes the engine icon 36, and which is slightly larger than the engine icon 36 is filled with a color that is distinct from the background of the engine icon 36, and the engine icon 36 is displayed in a transparent manner.

The display is performed as described above, so that the situation where the engine 18 functions can be visually known in an easily manner.

As shown in FIGS. 12(A) to 12(D), the arrow lines 48 (first arrow indications 48A and second arrow indications 48B) indicating the wheel rotation directions of the front wheels 22 and the rear wheels 24 are displayed correspondingly with the transmission of driving force energy from the engine 18 to the front wheels 22, and that of electric power energy from the driving battery 12 to the front wheels 22 and the rear wheels 24.

The arrow lines 48 are superimposedly displayed along the outer circumferences of the wheel symbols 38A, 40A representing the shapes of the front wheels, and the wheel symbols 38A, 40A representing the shapes of the rear wheels, so that also the rotation directions of the wheels 22, 24 can be visually known in an easily manner by means of the wheel icons. The first arrow indications 48 are displayed correspondingly with the first and second display members 42A, 42B indicating transmission of electric power energy, moreover, and the second arrow indications 48B are displayed correspondingly with the third display member 42C indicating transmission of driving force energy are displayed, for example, in the same color, and by the lines of the same thickness and of the same kind or broken lines or dot-dash lines, whereby the correspondence relationship between the energy transmission and the rotations of the wheels can be visually known in an easily manner The first display segments 50 and first arrow indications 48A which relate to the electric power, and the second display segments 52 and second arrow indications 48B which relate to the driving force from the engine are displayed in different colors and lines, so that the electric power and the driving force can be visually distinguished from each other in an easily manner.

The visibility of the first arrow indication 48A and the second arrow indication 48B can be improved by drawing them in a juxtaposed manner to form the arrow line 48 having one completed arrow head portion.

Figure 17:
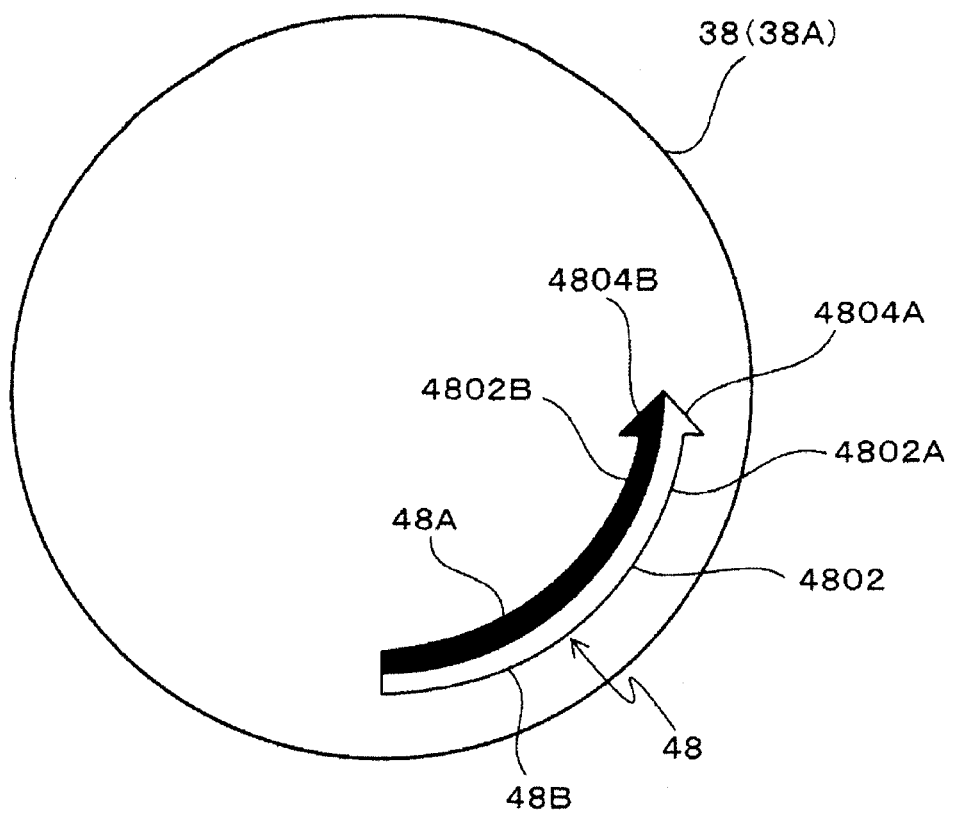
FIG. 17 is a view illustrating a first arrow indication 48A and a second arrow indication 48B which constitute the arrow line 48.

As shown in FIG. 17, namely, the arrow line 48 is configured by the first arrow indication 48A and the second arrow indication 48B.

The arrow line 48 is configured by a curved portion 4802 which curvingly extends with a width, and projections 4804A, 4804B which are projected from a tip end of the curved portion 480 and respectively from the both width sides of the tip end.

The first arrow indication 48A is configured by a curved part 4802A having a width half that of the curved portion 4802, and the projection 4804A which is projected from the half curved part 4802A.

The second arrow indication 48B is configured by a curved part 4802B which has the remaining half width of the curved portion 4802, and the projection 4804B which is projected from the half curved part 4802B.

(3) The case where the charging operation by the engine 18 and the running by the engine 18 and the driving battery 12 are performed (FIGS. 6(A) to 6(D)) (FIGS. 13(A) to 13(D)):

In this case, the operation of causing the generator 20 to generate electricity by the power of the engine 18, and charging the driving battery 12 with the generated electric power, that of driving the front wheels 22 by the power of the engine 18, and that of causing the front motor 14 and the rear motor 16 to rotate by the electric power of the driving battery 12, thereby driving the front wheels 22 and the rear wheels 24 are simultaneously performed.

Four display members, i.e., the fourth display member 42D being bridged between the engine icon 36 and the battery icon 34, the third display member 42C being bridged between the engine icon 36 and the front-wheel icon 38, the first display member 42A being bridged between the battery icon 34 and the front-wheel icon 38, and the second display member 42B being bridged between the battery icon 34 and the rear-wheel icon 40 are displayed.

Then, the images of FIGS. 6(A) to 6(D) are repeatedly displayed in this sequence to cause the display states of the display members 42A to 42D to be changed with the passage of time. Therefore, the direction of transmission of charging power energy from the engine 18 to the battery 12 is indicated by the fourth display member 42D, that of transmission of driving force energy from the engine 18 to the front wheels 22 is indicated by the third display member 42C, and the directions of transmission of electric power energy from the driving battery 12 to the front wheels 22 and the rear wheels 24 are indicated by the first and second display members 42A, 42B.

As shown in FIGS. 13(A) to 13(D), the arrow lines 48 (first arrow indications 48A and second arrow indications 48B) indicating the wheel rotation directions of the front wheels 22 and the rear wheels 24 are displayed correspondingly with the transmission of driving force energy from the engine 18 to the front wheels 22, and that of electric power energy from the driving battery 12 to the front wheels 22 and the rear wheels 24. The description of the display members (first and second display segments 50, 52) and the arrow lines 48 (first and second arrow indications 48A, 48B) overlaps with that of FIGS. 4(A) to 11(D) and FIGS. 5(A) and 12(D) above, and therefore is omitted.

Figure 7:
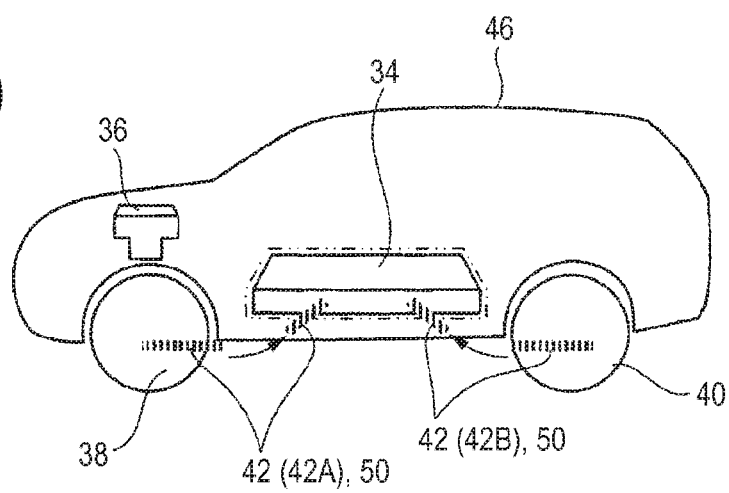
FIG. 7(A) to FIG. 7(D) are diagrams illustrating the displaying operation in the case of regenerative braking in which regenerative braking forces caused by a front motor 14 and a rear motor 16 are used.
Figure 7:
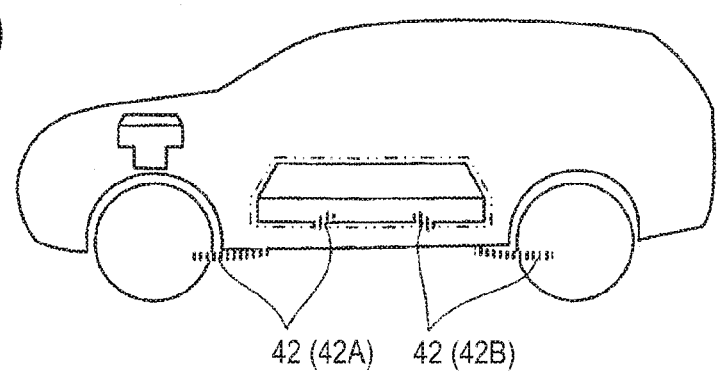
Figure 7:
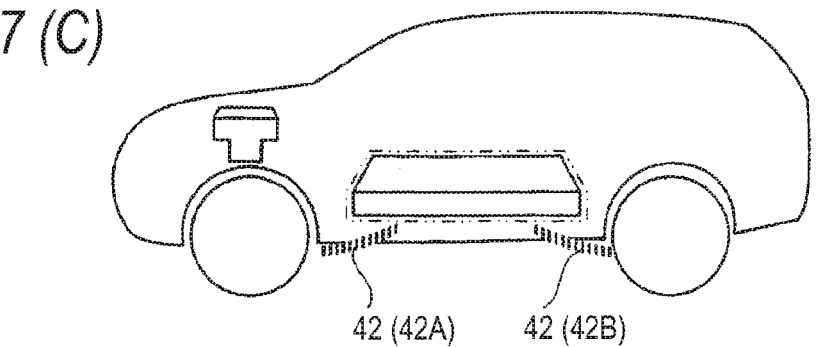
Figure 7:
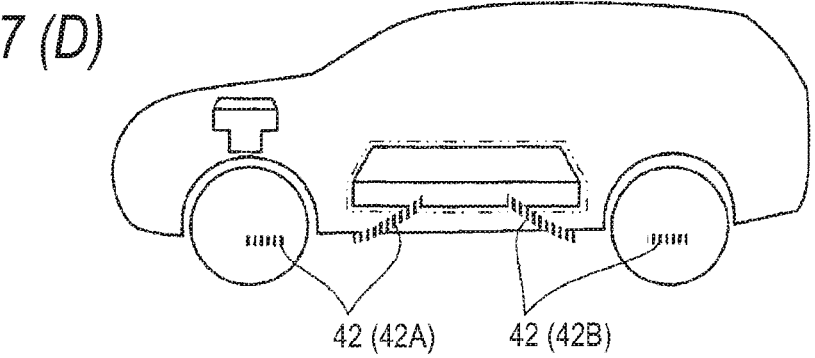
Figure 14:
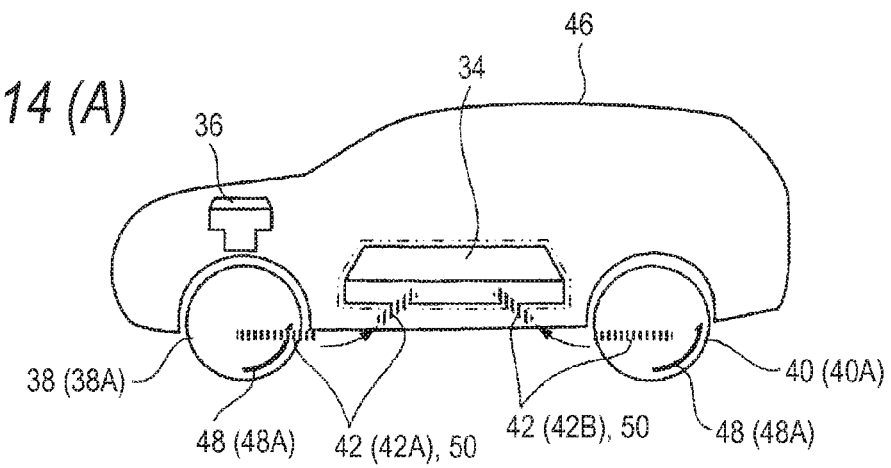
FIG. 14(A) to FIG. 14(D) are diagrams in which the arrow line 48 indicating the rotation direction of the wheels is added to the displaying operation in the case of the regenerative braking in which the regenerative braking forces caused by the front motor 14 and the rear motor 16 are used.
Figure 14:
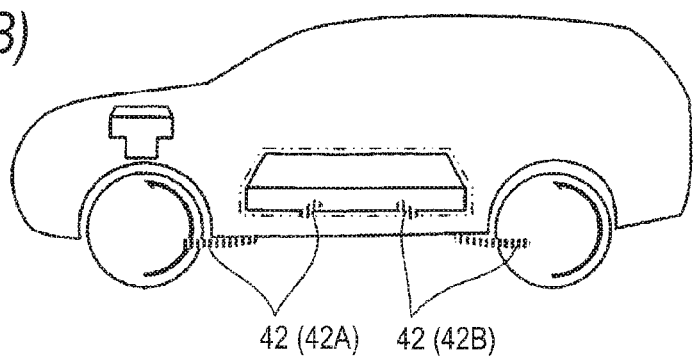
Figure 14:
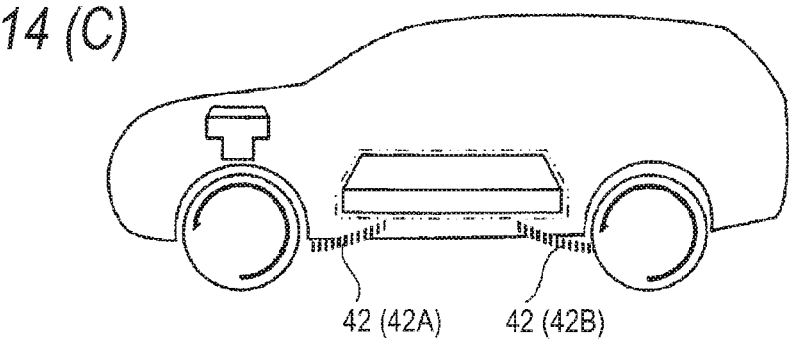
Figure 14:
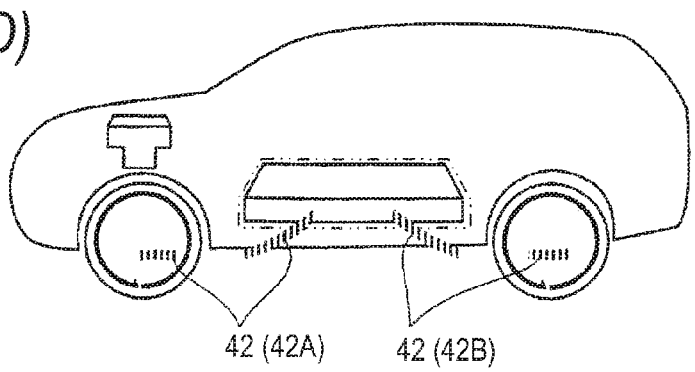
Figure 15:
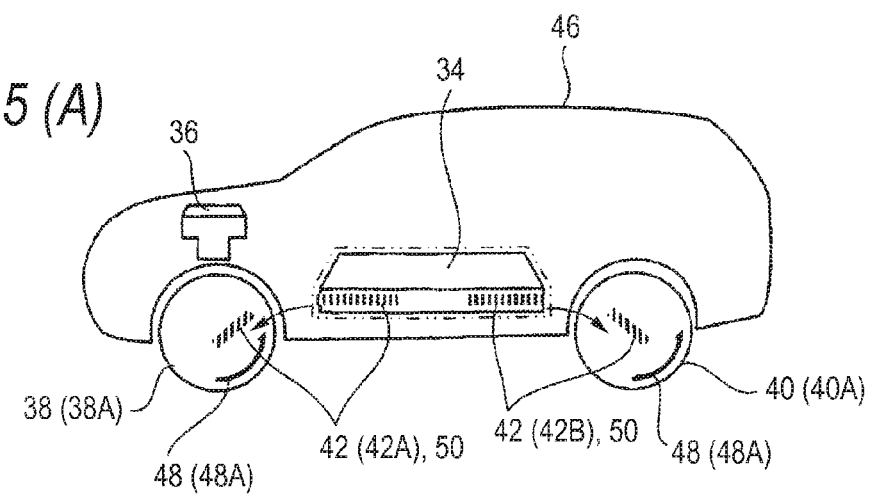
FIG. 15(A) to FIG. 15(D) are diagrams in which the arrow line 48 indicating the rotation direction of the wheels is added to the displaying operation in the case of the electric running.
Figure 15:
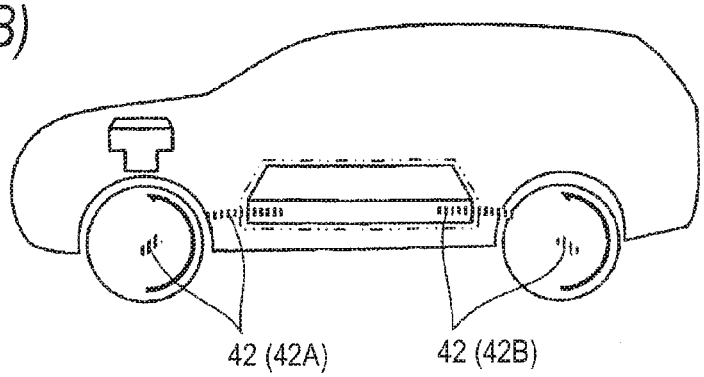
Figure 15:
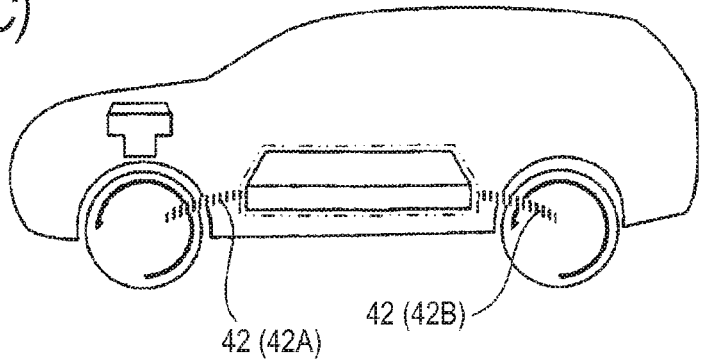
Figure 15:
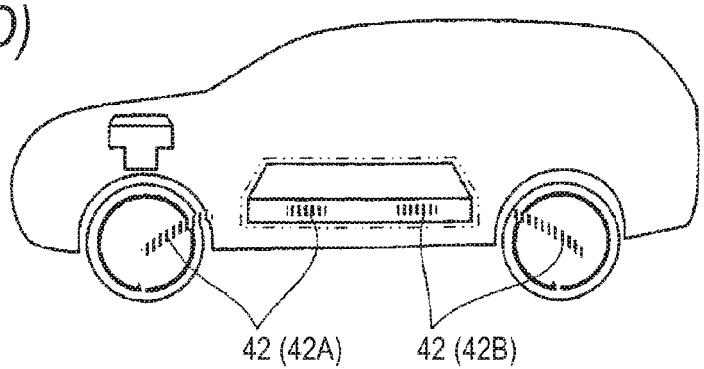

(4) The case of regenerative braking (FIGS. 7(A) to 7 (D)) (FIGS. 14 (A) to 14(D)):

In this case, the operation of causing the front motor 14 to generate electricity by the front wheels 22, causing the rear motor 16 to generate electricity by the rear wheels 24, and charging the driving battery 12 with the generated electric powers is performed.

Two display members, i.e., the first display member 42A being bridged between the battery icon 34 and the front-wheel icon 38, and the second display member 42B being bridged between the battery icon 34 and the rear-wheel icon 40 are displayed.

Moreover, the third display member 42C is not displayed, thereby indicating that transmission of driving force energy between the engine 18 and the front wheels 22 is not performed, and the fourth display member 42D is not displayed, thereby indicating that transmission of charging power energy between the engine 18 and the driving battery 12 is not performed.

Then, the images of FIGS. 7(A) to 7(D) are repeatedly displayed in this sequence to cause the display states of the display members 42A to 42D to be changed with the passage of time.

Namely, each of the display members 42A, 42B is divided into a plurality of display regions (first display segments 50) along the extending direction, and the display and non-display of each of the display regions are sequentially switched over with the passage of time, so that the display regions are displayed as if they sequentially move along the energy transmission direction. In FIGS. 4(A) to 6(D) and FIGS. 11(A) to 13(D) described above, the transmission of output electric power energy from the battery 12 to the wheels 22, 24 is indicated as if the plurality of display regions (first display segments 50) sequentially move from the battery icon 34 to the wheel icons 38, 40. In FIGS. 7(A) to 7(D) and FIGS. 14(A) to 14(D), however, the transmission of charging power energy (regenerative electric power energy) from the wheels 22, 24 to the battery 12 is indicated as if the plurality of display regions (first display segments 50) sequentially move from the wheel icons 38, 40 to the battery icon 34.

Therefore, the directions of transmission of electric power energy from the front wheels 22 and the rear wheels 24 to the driving battery 12 are indicated by the first and second display members 42A, 42B.

As shown in FIGS. 14(A) to 14(D), the arrow lines 48 (first arrow indications 48A) indicating the wheel rotation directions of the front wheels 22 and the rear wheels 24 are displayed correspondingly with the transmission of electric power energy from the front wheels 22 and the rear wheels 24 to the driving battery 12.

Figure 8:
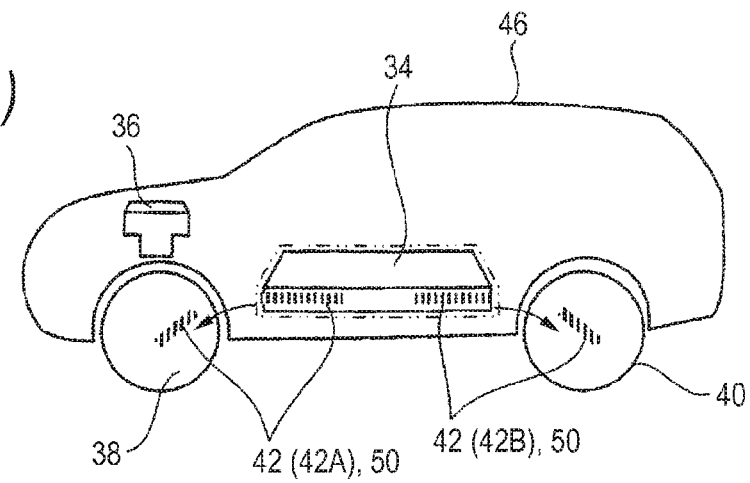
FIG. 8(A) to FIG. 8(D) are diagrams illustrating the displaying operation in the case of electric running.
Figure 8:
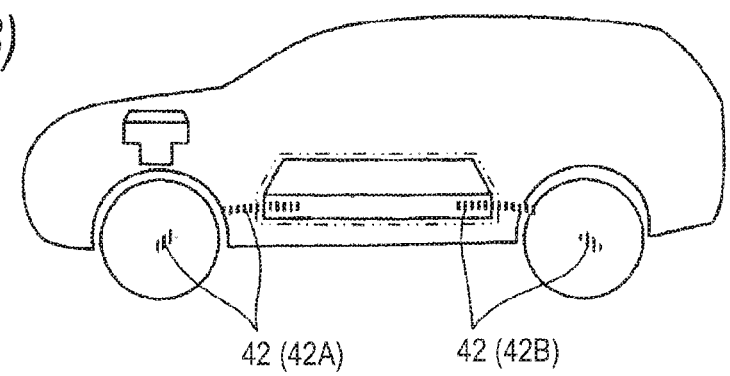
Figure 8:
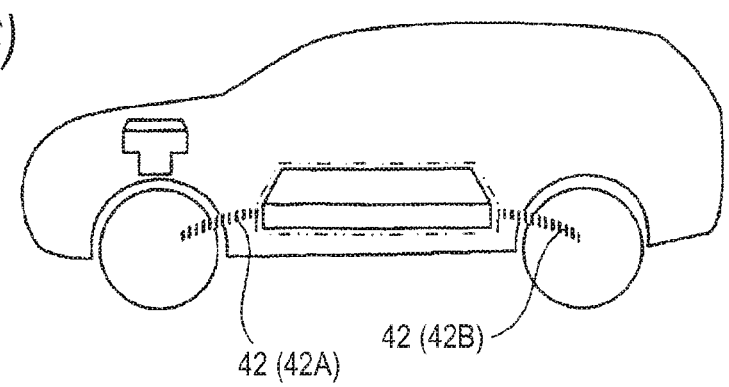
Figure 8:
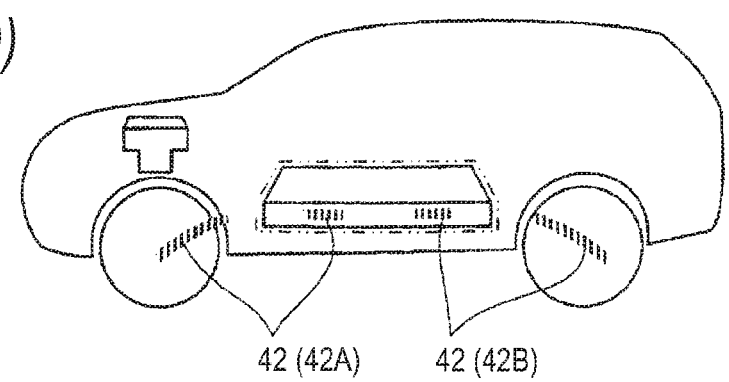
Figure 9:
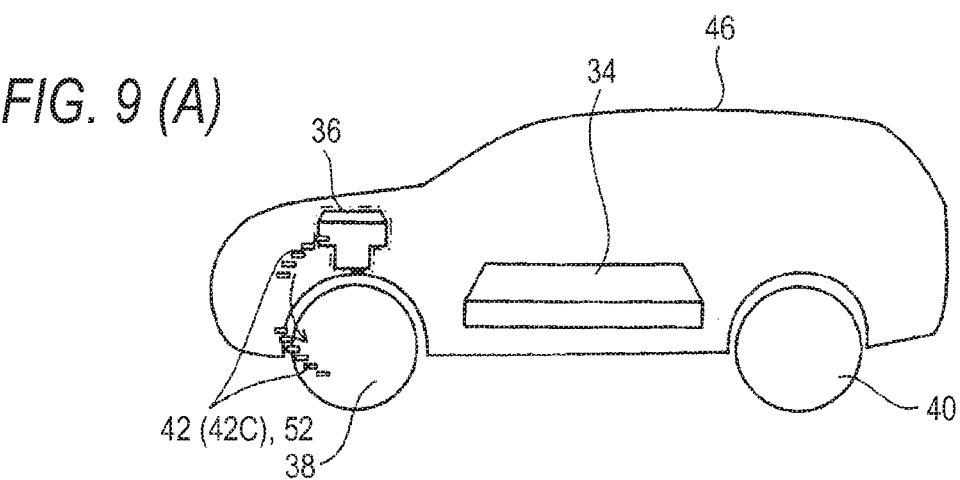
FIG. 9(A) to FIG. 9(D) are diagrams illustrating the displaying operation in the case of engine running.
Figure 9:
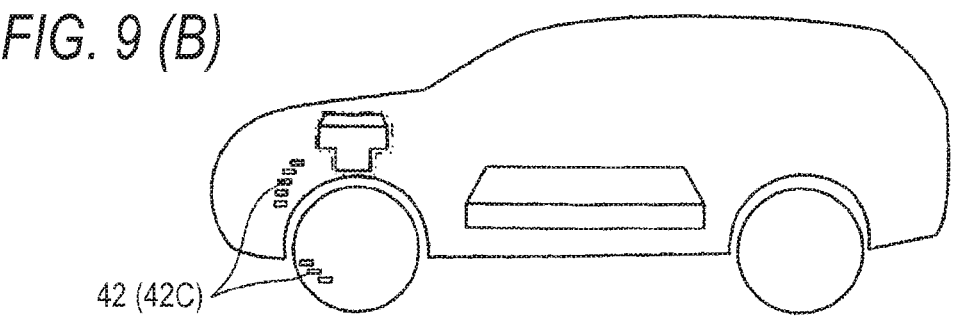
Figure 9:
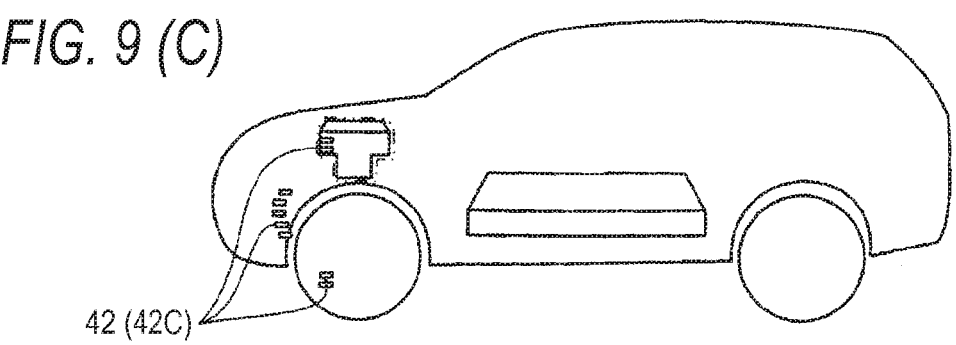
Figure 9:
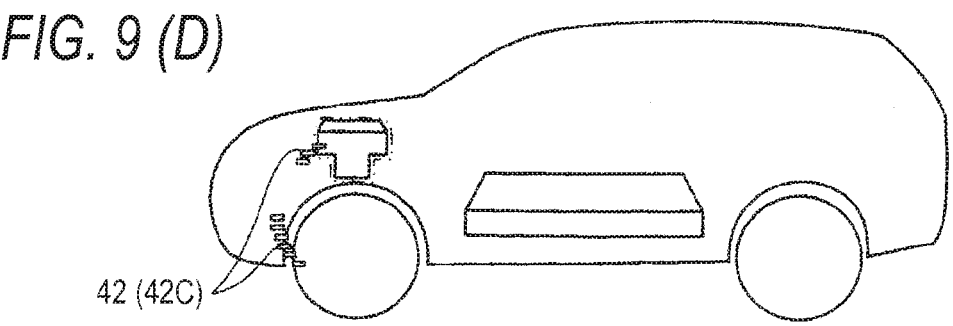
Figure 10:
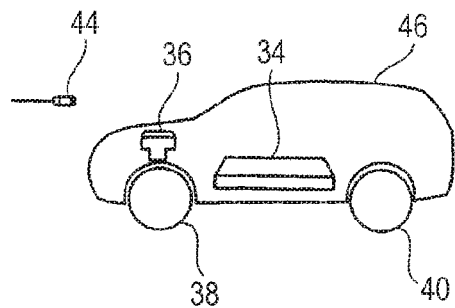
FIG. 10(A) to FIG. 10(G) are diagrams illustrating the displaying operation in the case where the driving battery 12 is externally charged by a charging apparatus outside of the vehicle.
Figure 10:
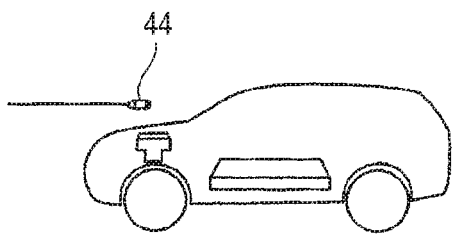
Figure 10:
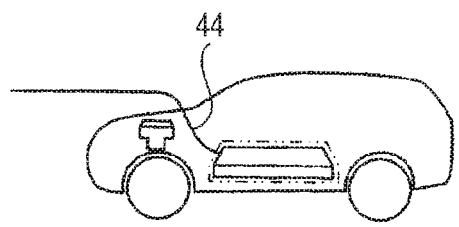
Figure 10:
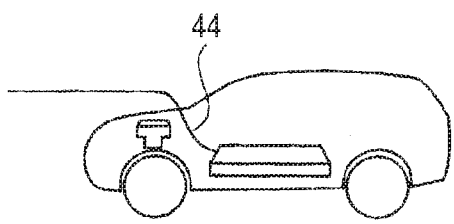
Figure 10:
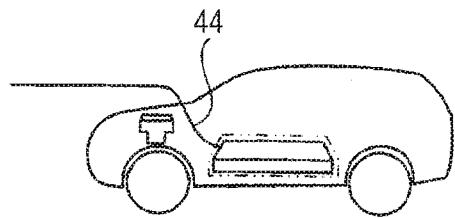
Figure 10:
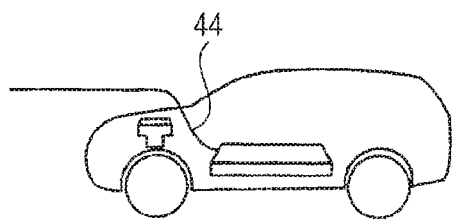
Figure 10:
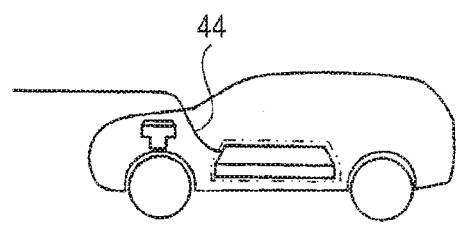
Figure 11:
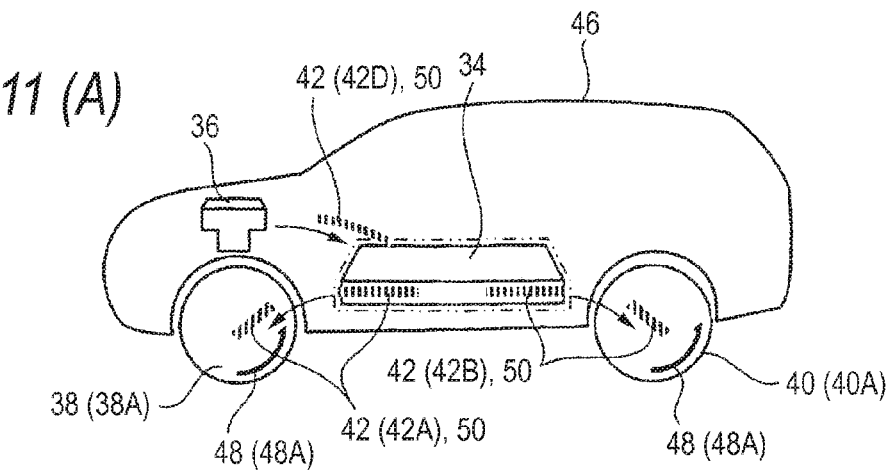
FIG. 11(A) to FIG. 11(D) are diagrams in which an arrow line 48 indicating the rotation direction of wheels is added to the displaying operation in the case where the charging operation by the engine 18 and the running by the driving battery 12 are performed.
Figure 11:
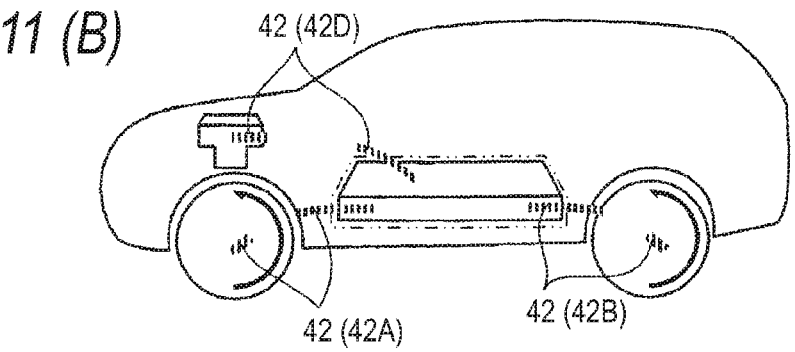
Figure 11:
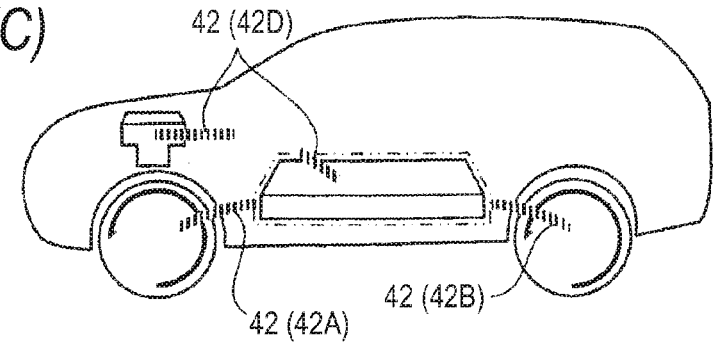
Figure 11:
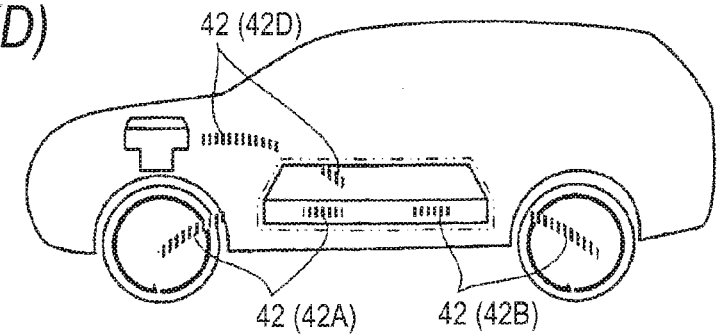
Figure 12:
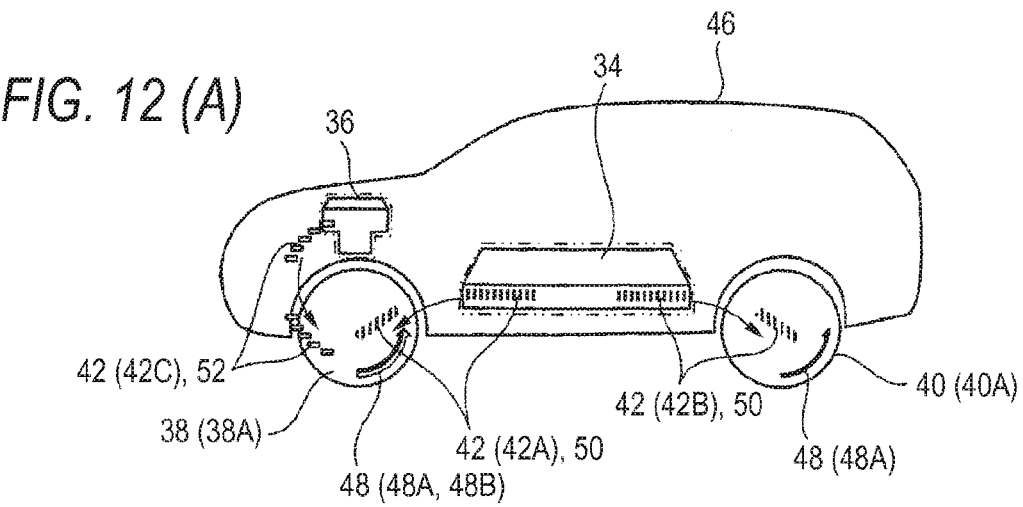
FIG. 12(A) to FIG. 12(D) are diagrams in which the arrow line 48 indicating the rotation direction of the wheels is added to the displaying operation in the case where the running by the engine 18 and the driving battery 12 is performed.
Figure 12:
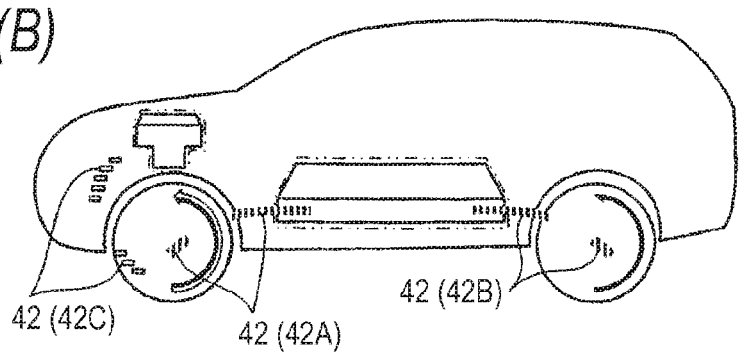
Figure 12:
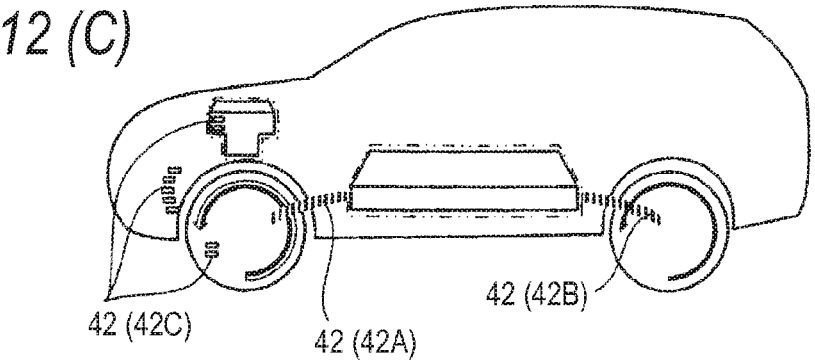
Figure 12:
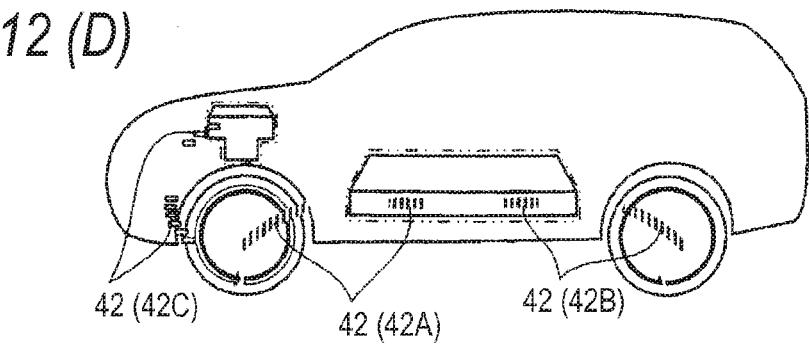
Figure 13:
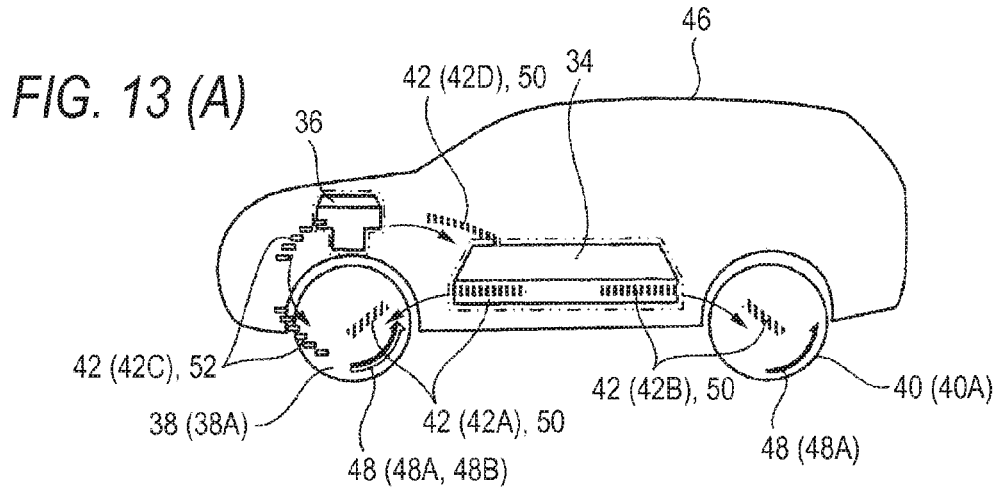
FIG. 13(A) to FIG. 13(D) are diagrams in which the arrow line 48 indicating the rotation direction of the wheels is added to the displaying operation in the case where the charging operation by the engine 18, and the running by the engine 18 and the driving battery 12 are performed.
Figure 13:
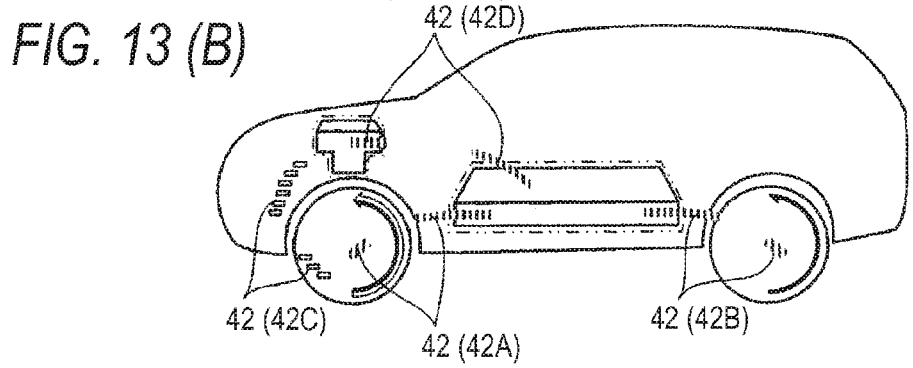
Figure 13:
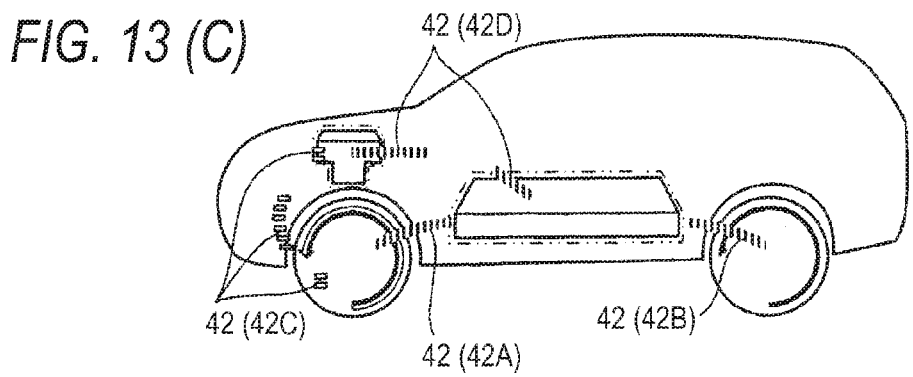
Figure 13:
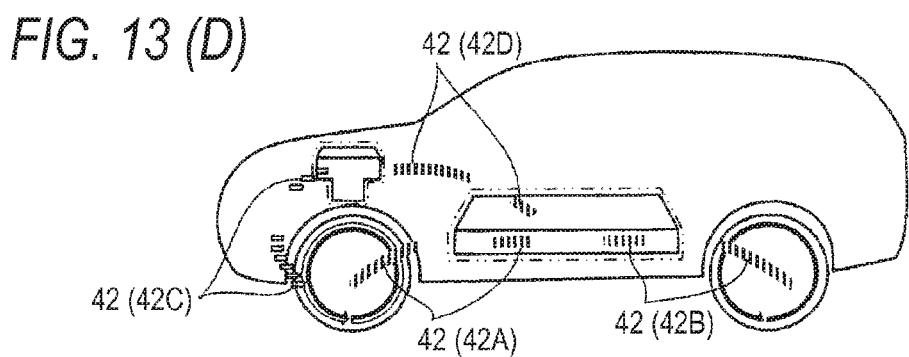

(5) In the case of electric running (FIGS. 8(A) to 8 (D)) (FIGS. 15(A) to 15(D)):

In this case, the operation of causing the front motor 14 and the rear motor 16 to rotate by the electric power of the driving battery 12, thereby driving the front wheels 22 and the rear wheels 24 is performed.

Two display members, i.e., the first display member 42A being bridged between the battery icon 34 and the front-wheel icon 38, and the second display member 42B being bridged between the battery icon 34 and the rear-wheel icon 40 are displayed.

Moreover, the third display member 42C is not displayed, thereby indicating that transmission of driving force energy between the engine 18 and the front wheels 22 is not performed, and the fourth display member 42D is not displayed, thereby indicating that transmission of charging power energy between the engine 18 and the driving battery 12 is not performed.

Then, the images of FIGS. 8(A) to 8(D) are repeatedly displayed in this sequence to cause the display states of the display members 42A to 42D to be changed with the passage of time. Therefore, the directions of transmission of electric power energy from the driving battery 12 to the front wheels 22 and the rear wheels 24 are indicated by the first and second display members 42A, 42B.

As shown in FIGS. 15(A) to 15(D), the arrow lines 48 (first arrow indications 48A) indicating the wheel rotation directions of the front wheels 22 and the rear wheels 24 are displayed correspondingly with the transmission of electric power energy from the driving battery 12 to the front wheels 22 and the rear wheels 24. The description of the display members 42A, 42B (first display segments 50) and the arrow lines 48 (first arrow indications 48A) overlaps with that of FIGS. 4(A) to 4(D) and FIGS. 11(A) to 11(D) above, and therefore is omitted.

(6) In the case of engine running (FIGS. 9(A) to 9(D)) (FIGS. 16(A) to 16(D)):

In this case, the operation of driving the front wheels 22 by the power of the engine 18 is performed.

The third display member 42C being bridged between the engine icon 36 and the front-wheel icon 38 is displayed.

Moreover, the first display member 42A and the second display member 42B are not displayed, thereby indicating that transmission of electric power energy between the driving battery 12, and the front wheels 22 and the rear wheels 24 is not performed, and the fourth display member 42D is not displayed, thereby indicating that transmission of charging power energy between the engine 18 and the driving battery 34 is not performed.

Then, the images of FIGS. 9(A) to 9(D) are repeatedly displayed in this sequence to cause the display states of the display members 42A to 42D to be changed with the passage of time.

Namely, the display member 42C is divided into a plurality of display regions (second display segments 52) along the extending direction, and the display and non-display of each of the display regions are sequentially switched over with the passage of time, so that the display regions are displayed as if they sequentially move along the energy transmission direction.

Therefore, the direction of transmission of driving force energy from the engine 18 to the front wheels 22 is indicated by the third display member 42C.

As shown in FIGS. 16(A) to 16(D), the arrow lines 48 (second arrow indications 48B) indicating the wheel rotation directions of the front wheels 22 and the rear wheels 24 are displayed correspondingly with the transmission of driving force energy from the engine 18 to the front wheels 22. The description of the third display member 42C (second display segments 52) and the arrow lines 48 (second arrow indications 48B) overlaps with that of FIGS. 5(A) to 5(D) and FIGS. 12(A) to 12(D) above, and therefore is omitted.

In the embodiment, the case where the transmission direction of energy is displayed by sequentially switching the display and non-display of each of the plurality of display regions constituting each of the display members 42A to 42D of the energy transmission state displaying portion 42, with the passage of time has been described.

However, the energy transmission state displaying portion 42 is required only to indicate the transmission direction of energy, and may employ various known display modes such as a mode where the energy transmission state displaying portion 42 is configured by arrow-shaped icons.

Next, display contents of the charge icon 44 will be specifically described.

In this case, in the vehicle 10 in a parking state, external charging is performed on the driving battery 12 by the charging apparatus which is disposed outside of the vehicle.

As shown in FIGS. 10(A) to 10(G), the charge icon 44 representing a charging cable is displayed, and the first to fourth display members 42A to 42D are not displayed, thereby indicating that transmissions of energy corresponding to the display members are not performed.

Then, the images of FIGS. 10(A) to 10(G) are repeatedly displayed in this sequence to indicate that the charging cable is connected to the vehicle 10 to charge the driving battery 12.

In the images of FIGS. 10(C), 10(E), and 10(G), as indicated by the dash-dot-dot line surrounding the battery icon 34, a frame-like area along the outline of the battery icon 34 is displayed so as to be higher in luminance.

In the images of FIGS. 10(D) and 10(F), the frame-like area along the outline of the battery icon 34 is displayed so as to return to the original luminance.

When the images of FIGS. 10(C), 10(D), 10(E), 10(F), and 10(G) are consecutively displayed in this sequence, the high and low luminance levels of the frame-like area along the outline of the battery icon 34 are alternately repeated.

The display is performed as described above, so that the situation where the driving battery 12 is charged by external charging can be visually known in an easily manner.

According to the embodiment, as described above, the transmission state of energy is indicated while being directly bridged between the battery icon 34, the engine icon 36, the front-wheel icon 38, and the rear-wheel icon 40. Therefore, the configuration is advantageous in displaying the energy flow in an easy-to-understand way by minimum necessary display contents.

Moreover, the energy transmission state displaying portion 42 indicates the presence or absence and the direction of transmission of energy between the battery icon 34, the engine icon 36, the front-wheel icon 38, and the rear-wheel icon 40. Therefore, the configuration is further advantageous in displaying the energy flow in an easy-to-understand way.

If it is determined that charging of the driving battery 12 by the charging apparatus outside of the vehicle 10 exists, the charge icon 44 indicating the charging operation by the charging apparatus is displayed. Therefore, the configuration is advantageous in displaying the charge state in an easy-to-understand way.

In this case, the charge icon 44 is an icon representing a charging cable. Therefore, the configuration is further advantageous in displaying the charge state in an easy-to-understand way.

Moreover, the energy transmission state displaying portion 42 is configured so that the transmission direction of energy is indicated while the display states of the display members are changed with the passage of time. Therefore, the configuration is further advantageous in displaying an energy flow in an easy-to-understand way.

Although, in the embodiment, the case where the vehicle is a plug-in hybrid electric vehicle has been described, the invention can be applied also to a hybrid electric vehicle in which external charging is not performed, an electric vehicle which travels by using only the electric power of a driving battery, and a gasoline or diesel engine vehicle which travels by using only an engine.

DESCRIPTION OF REFERENCE NUMERALS AND SIGNS

10 . . . vehicle, 12 . . . driving battery, 14 . . . front motor, 16 . . . rear motor, 18 . . . engine, 20 . . . generator, 22 . . . front wheel, 24 . . . rear wheel, 26 . . . ECU, 26A . . . energy transmission state determination device, 26B . . . charge state determination device, 28 . . . charge control ECU, 30 . . . navigation device, 31 . . . display device, 32 . . . information display apparatus for a vehicle, 34 . . . battery icon, 36 . . . engine icon, 38 . . . front-wheel icon, 38A . . . wheel symbol of a front wheel, 40 . . . rear-wheel icon, 40A . . . wheel symbol of a rear wheel, 42 . . . energy transmission state displaying portion, 44 . . . charge icon, 42A . . . first display member, 42B . . . second display member, 42C . . . third display member, 42D . . . fourth display member, 44 . . . charge icon, 48 . . . arrow line, 48A . . . first arrow indication, 48B . . . second arrow indication, 50 . . . first display segment, 52 . . . second display segment.

The invention claimed is:

1. An information display apparatus for a vehicle which is to be mounted on the vehicle, the vehicle including: a battery for storing energy; an electric motor that is driven by the energy; and a wheel that is rotated by the electric motor,
the information display apparatus comprising:
an energy transmission state determination device which is configured to determine a transmission state of the energy; and
a display device which is configured to display a battery icon representing the battery, a wheel icon representing a shape of the wheel, and an energy transmission state displaying portion indicating the transmission state of the energy, wherein
the energy transmission state displaying portion is displayed between the battery icon and the wheel icon, and
wherein the wheel icon includes a front wheel icon representing a front wheel and a rear wheel icon representing a rear wheel, and the energy transmission state display portion is displayed between the battery icon and at least one of the front wheel icon and the rear wheel icon representing at least one of the front wheel and the rear wheel being rotated by the electric motor.

2. The information display apparatus for the vehicle according to claim 1, wherein
the vehicle further includes an internal combustion engine which is configured to generate energy,
the display device further displays an internal-combustion engine icon representing the internal combustion engine, and
the energy transmission state displaying portion is displayed between the internal-combustion engine icon, the battery icon, and the wheel icon, and indicates presence or absence and a direction of transmission of the energy between the internal-combustion engine icon, the battery icon, and the wheel icon.

3. The information display apparatus for the vehicle according to claim 2, wherein
the energy transmission state displaying portion includes a display member which extends along a direction connecting two icons in which energy transmission is performed, and
the display device displays the direction of transmission of the energy by moving the display member in the direction of the transmission.

4. The information display apparatus for the vehicle according to claim 3, wherein
the display member includes:
a first display segment which indicates transmission of electric power energy; and
a second display segment which indicates transmission of driving force energy, and which is different in color from the first display segment.

5. The information display apparatus for the vehicle according to claim 4, wherein
the wheel icon includes:
a wheel symbol depicting an outline of the wheel; and
an arrow line indicating a rotation direction of the wheel,
the arrow line is displayed while being superimposed on the wheel symbol, along an outer circumference of the wheel depicted by the wheel symbol,
the arrow line includes:
a first arrow indication corresponding to energy transmission between the battery and the wheel; and a second arrow indication corresponding to energy transmission between the internal combustion engine and the wheel, a color of the first arrow indication is identical or similar to a color of the first display segment, and a color of the second arrow indication is identical or similar to a color of the second display segment.

6. The information display apparatus for the vehicle according to claim 5, wherein the arrow line includes: a curved portion which curvingly extends with a width; and projections which are projected from a tip end of the curved portion and which are respectively projected from both sides of the tip end in a width direction, the first arrow indication includes: a curved part which has a width half a width of the curved portion; and the projection which is projected from the half curved part, and the second arrow indication includes: a curved part which has a remaining half width of the curved portion; and the projection which is projected from the remaining half curved part.

7. The information display apparatus for the vehicle according to claim 5, wherein the battery is configured so as to be chargeable with an electric power functioning as the energy by a charging apparatus which is disposed outside of the vehicle, the information display apparatus further comprises a charge state determination device which is configured to determine whether charging of the battery by the charging apparatus exists or not, and, if it is determined that the charging of the battery by the charging apparatus exists, the display device displays a charge icon indicating a charging operation by the charging apparatus.

8. The information display apparatus for the vehicle according to claim 4, wherein the battery is configured so as to be chargeable with an electric power functioning as the energy by a charging apparatus which is disposed outside of the vehicle, the information display apparatus further comprises a charge state determination device which is configured to determine whether charging of the battery by the charging apparatus exists or not, and, if it is determined that the charging of the battery by the charging apparatus exists, the display device displays a charge icon indicating a charging operation by the charging apparatus.

9. The information display apparatus for the vehicle according to claim 3, wherein the wheel icon includes:

a wheel symbol depicting an outline of the wheel; and an arrow line indicating a rotation direction of the wheel, the arrow line is displayed while being superimposed on the wheel symbol, along an outer circumference of the wheel depicted by the wheel symbol, and the arrow line includes:

a first arrow indication corresponding to energy transmission between the battery and the wheel; and a second arrow indication corresponding to energy transmission between the internal combustion engine and the wheel.

10. The information display apparatus for the vehicle according to claim 9, wherein the arrow line includes: a curved portion which curvingly extends with a width; and projections which are projected from a tip end of the curved portion and which are respectively projected from both sides of the tip end in a width direction, the first arrow indication includes: a curved part which has a width half a width of the curved portion; and the projection which is projected from the half curved part, and the second arrow indication includes: a curved part which has a remaining half width of the curved portion; and the projection which is projected from the remaining half curved part.

11. The information display apparatus for the vehicle according to claim 9, wherein the battery is configured so as to be chargeable with an electric power functioning as the energy by a charging apparatus which is disposed outside of the vehicle, the information display apparatus further comprises a charge state determination device which is configured to determine whether charging of the battery by the charging apparatus exists or not, and, if it is determined that the charging of the battery by the charging apparatus exists, the display device displays a charge icon indicating a charging operation by the charging apparatus.

12. The information display apparatus for the vehicle according to claim 3, wherein the battery is configured so as to be chargeable with an electric power functioning as the energy by a charging apparatus which is disposed outside of the vehicle, the information display apparatus further comprises a charge state determination device which is configured to determine whether charging of the battery by the charging apparatus exists or not, and, if it is determined that the charging of the battery by the charging apparatus exists, the display device displays a charge icon indicating a charging operation by the charging apparatus.

13. The information display apparatus for the vehicle according to claim 2, wherein the wheel icon includes:

a wheel symbol depicting an outline of the wheel; and an arrow line indicating a rotation direction of the wheel, the arrow line is displayed while being superimposed on the wheel symbol, along an outer circumference of the wheel depicted by the wheel symbol, and the arrow line includes:

a first arrow indication corresponding to energy transmission between the battery and the wheel; and a second arrow indication corresponding to energy transmission between the internal combustion engine and the wheel.

14. The information display apparatus for the vehicle according to claim 13, wherein the arrow line includes: a curved portion which curvingly extends with a width; and projections which are projected from a tip end of the curved portion and which are respectively projected from both sides of the tip end in a width direction, the first arrow indication includes: a curved part which has a width half a width of the curved portion; and the projection which is projected from the half curved part, and the second arrow indication includes: a curved part which has a remaining half width of the curved portion; and the projection which is projected from the remaining half curved part.

15. The information display apparatus for the vehicle according to claim 2, wherein
the battery is configured so as to be chargeable with an electric power functioning as the energy by a charging apparatus which is disposed outside of the vehicle,
the information display apparatus further comprises a charge state determination device which is configured to determine whether charging of the battery by the charging apparatus exists or not, and,
if it is determined that the charging of the battery by the charging apparatus exists, the display device displays a charge icon indicating a charging operation by the charging apparatus.

16. The information display apparatus for the vehicle according to claim 1, wherein
the energy transmission state displaying portion includes a display member which extends along a direction connecting the battery icon and the wheel icon, and
the display device displays a direction of transmission of the energy by moving the display member in the direction of the transmission.

17. The information display apparatus for the vehicle according to claim 16, wherein
the wheel icon includes:
a wheel symbol depicting an outline of the wheel; and
an arrow line indicating a rotation direction of the wheel, and
the arrow line is displayed while being superimposed on the wheel symbol, along an outer circumference of the wheel depicted by the wheel symbol.

18. The information display apparatus for the vehicle according to claim 17, wherein
the battery is configured so as to be chargeable with an electric power functioning as the energy by a charging apparatus which is disposed outside of the vehicle,
the information display apparatus further comprises a charge state determination device which is configured to determine whether charging of the battery by the charging apparatus exists or not, and,
if it is determined that the charging of the battery by the charging apparatus exists, the display device displays a charge icon indicating a charging operation by the charging apparatus.

19. The information display apparatus for the vehicle according to claim 1, wherein
the wheel icon includes:
a wheel symbol depicting an outline of the wheel; and
an arrow line indicating a rotation direction of the wheel, and
the arrow line is displayed while being superimposed on the wheel symbol, along an outer circumference of the wheel depicted by the wheel symbol.

20. The information display apparatus for the vehicle according to claim 1, wherein
the battery is configured so as to be chargeable with an electric power functioning as the energy by a charging apparatus which is disposed outside of the vehicle,
the information display apparatus further comprises a charge state determination device which is configured to determine whether charging of the battery by the charging apparatus exists or not, and,
if it is determined that the charging of the battery by the charging apparatus exists, the display device displays a charge icon indicating a charging operation by the charging apparatus.

* * * * *